(12) United States Patent
Vasseur et al.

(10) Patent No.: US 10,404,727 B2
(45) Date of Patent: Sep. 3, 2019

(54) SELF ORGANIZING LEARNING TOPOLOGIES

(71) Applicant: Cisco Technology, Inc., San Jose, CA (US)

(72) Inventors: Jean-Philippe Vasseur, Anchorage, AK (US); Sébastien Gay, Les Rousses (FR); Grégory Mermoud, Veyras (CH); Pierre-André Savalle, Rueil-Malmaison (FR); Alexandre Honoré, Schaerbeek (BE); Fabien Flacher, Antony (FR)

(73) Assignee: Cisco Technology, Inc., San Jose, CA (US)

( * ) Notice: Subject to any disclaimer, the term of this patent is extended or adjusted under 35 U.S.C. 154(b) by 310 days.

(21) Appl. No.: 15/176,678

(22) Filed: Jun. 8, 2016

(65) Prior Publication Data
US 2017/0310691 A1    Oct. 26, 2017

Related U.S. Application Data

(60) Provisional application No. 62/313,537, filed on Mar. 25, 2016.

(51) Int. Cl.
*H04L 29/06* (2006.01)
*H04L 12/24* (2006.01)

(52) U.S. Cl.
CPC ...... *H04L 63/1425* (2013.01); *H04L 41/0631* (2013.01); *H04L 41/12* (2013.01); *H04L 41/147* (2013.01); *H04L 63/1458* (2013.01)

(58) Field of Classification Search
CPC .................................................. H04L 63/1425
See application file for complete search history.

(56) References Cited

U.S. PATENT DOCUMENTS

| 7,500,266 | B1 | 3/2009 | Vukelich et al. |
| 7,865,203 | B2 | 1/2011 | Lei et al. |
| 9,060,018 | B1 | 6/2015 | Yu et al. |
| 10,069,689 | B1 * | 9/2018 | Derby ............... H04L 41/12 |
| 2009/0193436 | A1 * | 7/2009 | Du ............... G06F 11/321 |
| | | | 719/318 |
| 2011/0082824 | A1 | 4/2011 | Allison et al. |

(Continued)

FOREIGN PATENT DOCUMENTS

| CN | 102760138 A | 10/2012 |
| CN | 104883278 A | 9/2015 |

OTHER PUBLICATIONS

European Search Report dated Aug. 1, 2017 in connection with European Application No. 17 16 2410.

*Primary Examiner* — Shawnchoy Rahman
(74) *Attorney, Agent, or Firm* — Behmke Innovation Group LLC; James Behmke; Stephen D. LeBarron

(57) ABSTRACT

In one embodiment, a networking device at an edge of a network generates a first set of feature vectors using information regarding one or more characteristics of host devices in the network. The networking device forms the host devices into device clusters dynamically based on the first set of feature vectors. The networking device generates a second set of feature vectors using information regarding traffic associated with the device clusters. The networking device models interactions between the device clusters using a plurality of anomaly detection models that are based on the second set of feature vectors.

16 Claims, 19 Drawing Sheets

(56) References Cited

U.S. PATENT DOCUMENTS

| | | | |
|---|---|---|---|
| 2012/0154831 A1* | 6/2012 | Wu | H04N 1/6033 358/1.9 |
| 2013/0339475 A1* | 12/2013 | Kataria | H04L 45/46 709/217 |
| 2015/0039513 A1 | 2/2015 | Adjaoute | |
| 2015/0101053 A1* | 4/2015 | Sipple | H04L 63/1425 726/24 |

* cited by examiner

SELF ORGANIZING LEARNING TOPOLOGIES

RELATED APPLICATIONS

This application claims priority to U.S. Provisional Application No. 62/313,537, filed Mar. 25, 2016, entitled "SELF ORGANIZING LEARNING TOPOLOGIES," by Vasseur et al., the contents of which are hereby incorporated by reference.

TECHNICAL FIELD

The present disclosure relates generally to computer networks, and, more particularly, to self organizing learning topologies.

BACKGROUND

Generally, Internet Behavioral Analytics (IBA) refers to the use of advanced analytics coupled with various networking technologies, to detect anomalies in a network. Such anomalies may include, for example, network attacks, malware, misbehaving and misconfigured devices, and the like. For example, the ability to model the behavior of a device (e.g., a host, networking switch, router, etc.) allows for the detection of malware, which is complimentary to the use of firewalls that use static signature. Observing behavioral changes (e.g., deviation from modeled behavior) using flows records, deep packet inspection, and the like, allows for the detection of an anomaly such as a horizontal movement (e.g. propagation of a malware, . . . ) or an attempt to perform information exfiltration, prompting the system to take remediation actions automatically.

One type of network attack that is of particular concern in the context of computer networks is a Denial of Service (DoS) attack. In general, the goal of a DoS attack is to prevent legitimate use of the services available on the network. For example, a DoS jamming attack may artificially introduce interference into the network, thereby causing collisions with legitimate traffic and preventing message decoding. In another example, a DoS attack may attempt to overwhelm the network's resources by flooding the network with requests, to prevent legitimate requests from being processed. A DoS attack may also be distributed, to conceal the presence of the attack. For example, a distributed DoS (DDoS) attack may involve multiple attackers sending malicious requests, making it more difficult to distinguish when an attack is underway. When viewed in isolation, a particular one of such a request may not appear to be malicious. However, in the aggregate, the requests may overload a resource, thereby impacting legitimate requests sent to the resource.

Botnets represent one way in which a DDoS attack may be launched against a network. In a botnet, a subset of the network devices may be infected with malicious software, thereby allowing the devices in the botnet to be controlled by a single master. Using this control, the master can then coordinate the attack against a given network resource.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
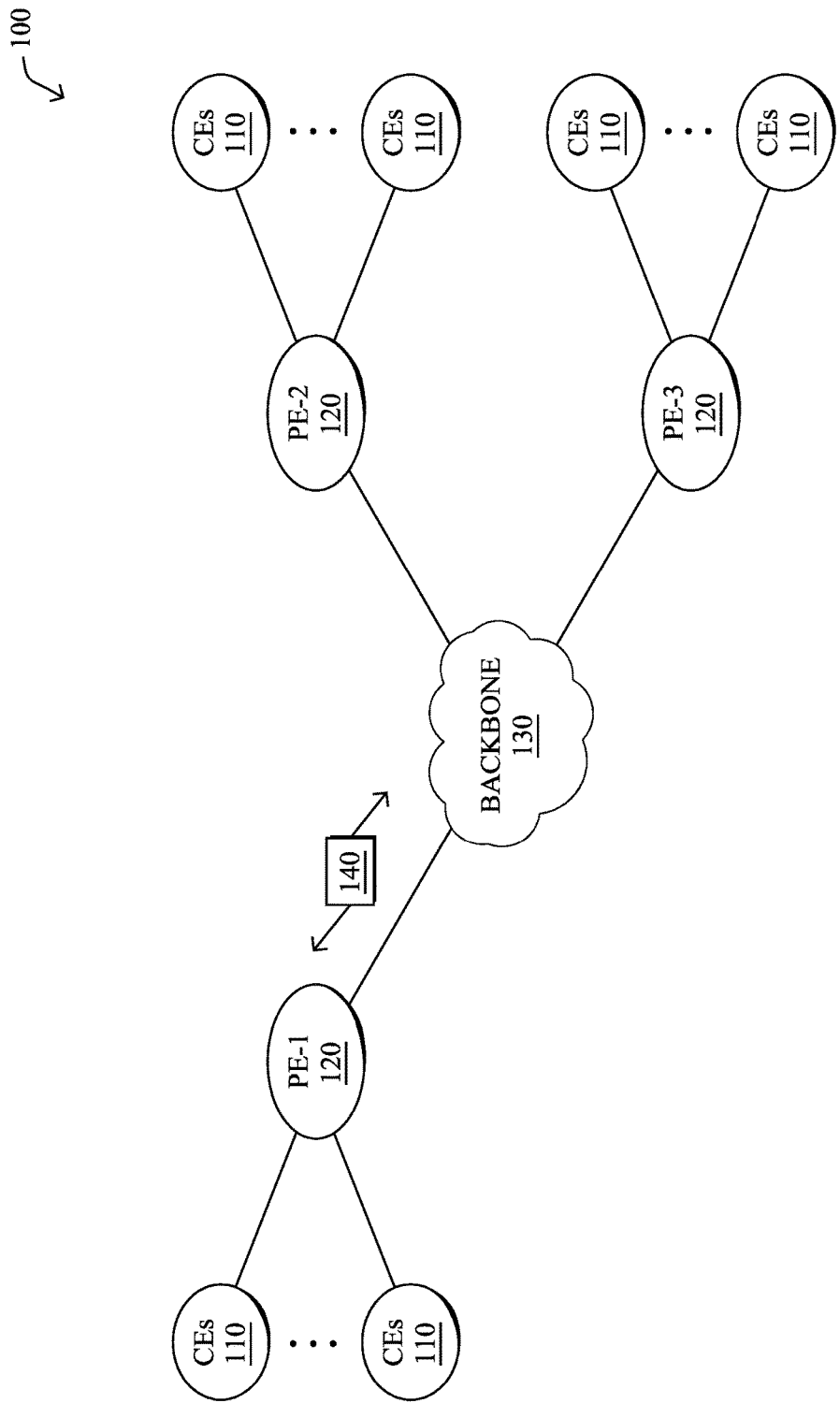
FIGS. 1A-1B illustrate an example communication network.

According to one or more embodiments of the disclosure, a networking device at an edge of a network generates a first set of feature vectors using information regarding one or more characteristics of host devices in the network. The networking device forms the host devices into device clusters dynamically based on the first set of feature vectors. The networking device generates a second set of feature vectors using information regarding traffic associated with the device clusters. The networking device models interactions between the device clusters using a plurality of anomaly detection models that are based on the second set of feature vectors.

In further embodiments, a device receives a plurality of edge identifiers. A particular edge identifier represents an interaction between two or more device clusters and each device cluster includes a plurality of host devices having similar characteristics. The device selects a set of edges from among the plurality of edge identifiers that are expected to exhibit similar behaviors. The device correlates received information regarding anomaly detection models associated with the selected set of edges, to determine a measure of confidence in the anomaly detection models associated with the selected set of edges. The device provides a notification that includes the measure of confidence.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
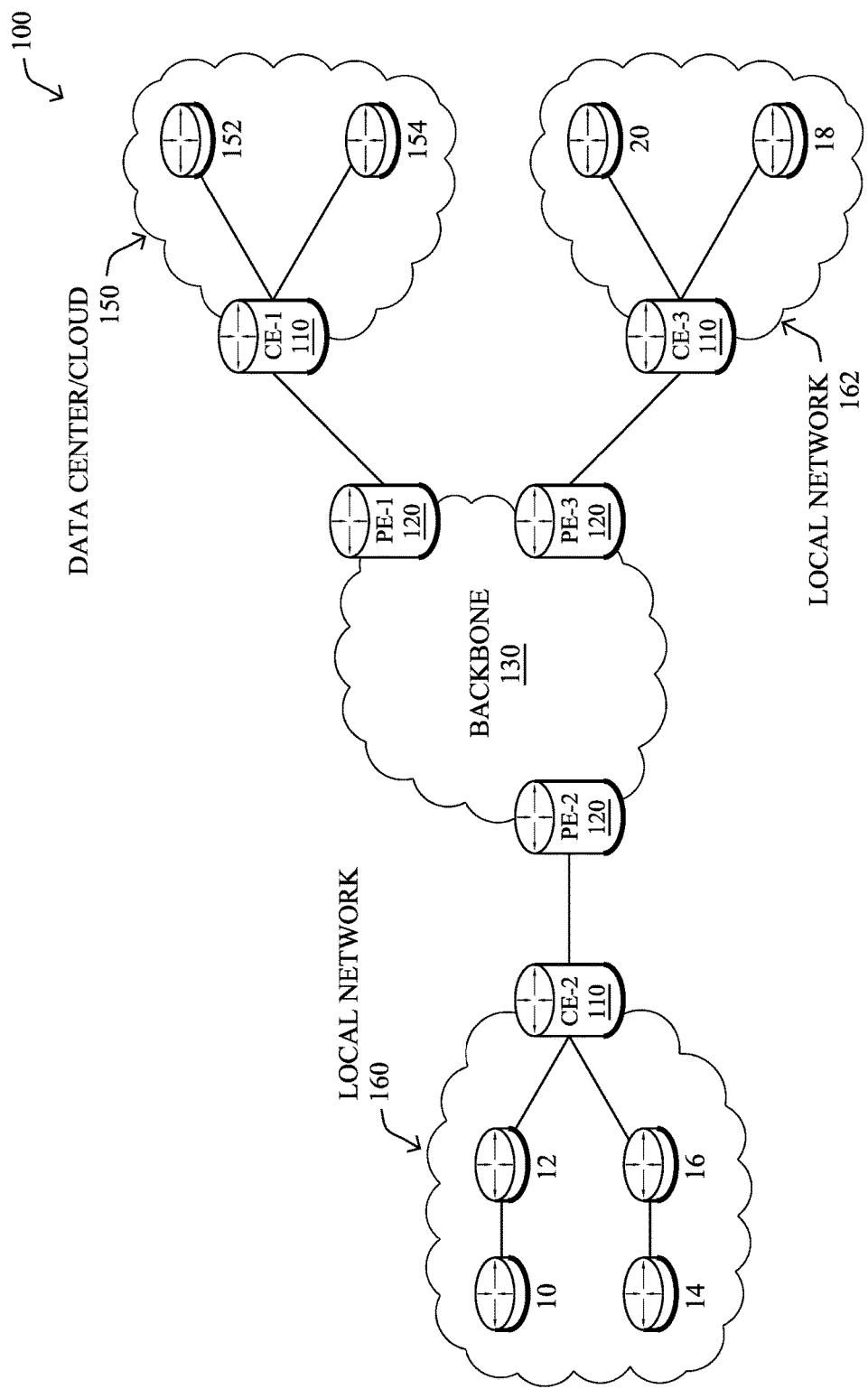

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
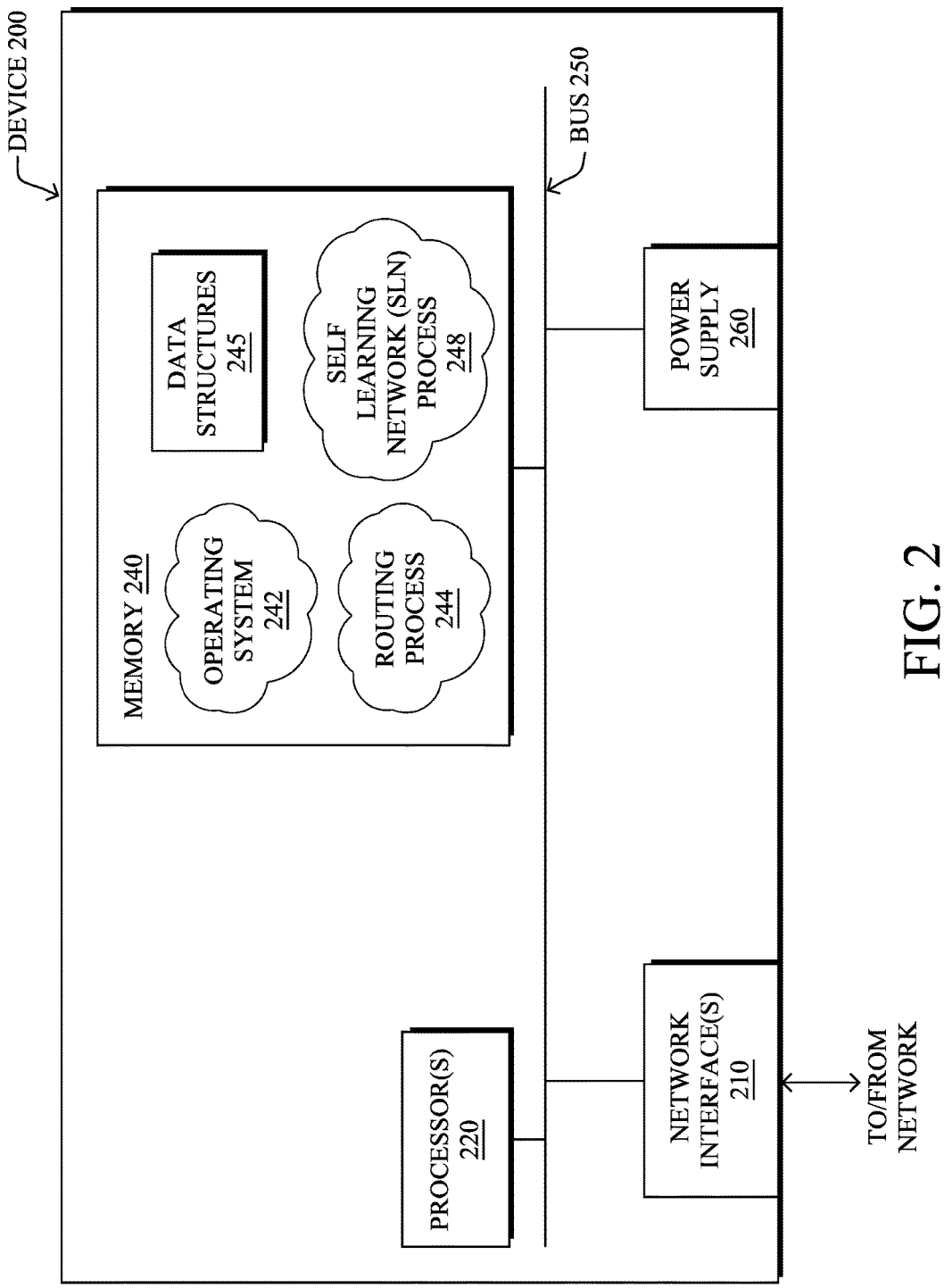
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise routing process 244 (e.g., routing services) and illustratively, a self learning network (SLN) process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Routing process/services 244 include computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database including, e.g., data used to make forwarding decisions. In particular, changes in the network topology may be communicated among routers 200 using routing protocols, such as the conventional OSPF and IS-IS link-state protocols (e.g., to "converge" to an identical view of the network topology).

Notably, routing process 244 may also perform functions related to virtual routing protocols, such as maintaining VRF instance, or tunneling protocols, such as for MPLS, generalized MPLS (GMPLS), etc., each as will be understood by those skilled in the art. Also, EVPN, e.g., as described in the IETF Internet Draft entitled "BGP MPLS Based Ethernet VPN" <draft-ietf-12vpn-evpn>, introduce a solution for multipoint L2VPN services, with advanced multi-homing capabilities, using BGP for distributing customer/client media access control (MAC) address reach-ability information over the core MPLS/IP network.

SLN process 248 includes computer executable instructions that, when executed by processor(s) 220, cause device 200 to perform anomaly detection functions as part of an anomaly detection infrastructure within the network. In general, anomaly detection attempts to identify patterns that do not conform to an expected behavior. For example, in one embodiment, the anomaly detection infrastructure of the network may be operable to detect network attacks (e.g., DDoS attacks, the use of malware such as viruses, rootkits, etc.). However, anomaly detection in the context of computer networking typically presents a number of challenges: 1.) a lack of a ground truth (e.g., examples of normal vs. abnormal network behavior), 2.) being able to define a "normal" region in a highly dimensional space can be challenging, 3.) the dynamic nature of the problem due to changing network behaviors/anomalies, 4.) malicious behaviors such as malware, viruses, rootkits, etc. may adapt in order to appear "normal," and 5.) differentiating between noise and relevant anomalies is not necessarily possible from a statistical standpoint, but typically also requires domain knowledge.

Anomalies may also take a number of forms in a computer network: 1.) point anomalies (e.g., a specific data point is abnormal compared to other data points), 2.) contextual anomalies (e.g., a data point is abnormal in a specific context but not when taken individually), or 3.) collective anomalies (e.g., a collection of data points is abnormal with regards to an entire set of data points). Generally, anomaly detection refers to the ability to detect an anomaly that could be triggered by the presence of malware attempting to access data (e.g., data exfiltration), spyware, ransom-ware, etc. and/or non-malicious anomalies such as misconfigurations or misbehaving code. Particularly, an anomaly may be raised in a number of circumstances:

Security threats: the presence of a malware using unknown attacks patterns (e.g., no static signatures) may lead to modifying the behavior of a host in terms of traffic patterns, graphs structure, etc. Machine learning processes may detect these types of anomalies using advanced approaches capable of modeling subtle changes or correlation between changes (e.g., unexpected behavior) in a highly dimensional space. Such anomalies are raised in order to detect, e.g., the presence of a 0-day malware, malware used to perform data ex-filtration thanks to a Command and Control (C2) channel, or even to trigger (Distributed) Denial of Service (DoS) such as DNS reflection, UDP flood, HTTP recursive get, etc. In the case of a (D)DoS, although technical an anomaly, the term "DoS" is usually used.

SLN process 248 may detect malware based on the corresponding impact on traffic, host models, graph-based analysis, etc., when the malware attempts to connect to a C2 channel, attempts to move laterally, or exfiltrate information using various techniques.

Misbehaving devices: a device such as a laptop, a server of a network device (e.g., storage, router, switch, printer, etc.) may misbehave in a network for a number of reasons: 1.) a user using a discovery tool that performs (massive) undesirable scanning in the network (in contrast with a lawful scanning by a network management tool performing device discovery), 2.) a software defect (e.g. a switch or router dropping packet because of a corrupted RIB/FIB or the presence of a persistent loop by a routing protocol hitting a corner case).

Dramatic behavior change: the introduction of a new networking or end-device configuration, or even the introduction of a new application may lead to dramatic behavioral changes. Although technically not anomalous, an SLN-enabled node having computed behavioral model(s) may raise an anomaly when detecting a brutal behavior change. Note that in such as case, although an anomaly may be raised, a learning system such as SLN is expected to learn the new behavior and dynamically adapts according to potential user feedback.

Misconfigured devices: a configuration change may trigger an anomaly: a misconfigured access control list (ACL), route redistribution policy, routing policy, QoS policy maps, or the like, may have dramatic consequences such a traffic black-hole, QoS degradation, etc. SLN process 248 may advantageously identify these forms of misconfigurations, in order to be detected and fixed.

In various embodiments, SLN process 248 may utilize machine learning techniques, to perform anomaly detection in the network. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

Computational entities that rely on one or more machine learning techniques to perform a task for which they have not been explicitly programmed to perform are typically referred to as learning machines. In particular, learning machines are capable of adjusting their behavior to their environment. For example, a learning machine may dynamically make future predictions based on current or prior network measurements, may make control decisions based on the effects of prior control commands, etc.

For purposes of anomaly detection in a network, a learning machine may construct a model of normal network behavior, to detect data points that deviate from this model. For example, a given model (e.g., a supervised, un-supervised, or semi-supervised model) may be used to generate and report anomaly scores to another device. Example machine learning techniques that may be used to construct and analyze such a model may include, but are not limited to, nearest neighbor (NN) techniques (e.g., k-NN models, replicator NN models, etc.), statistical techniques (e.g., Bayesian networks, etc.), clustering techniques (e.g., k-means, etc.), neural networks (e.g., reservoir networks, artificial neural networks, etc.), support vector machines (SVMs), or the like.

One class of machine learning techniques that is of particular use in the context of anomaly detection is clustering. Generally speaking, clustering is a family of techniques that seek to group data according to some typically predefined notion of similarity. For instance, clustering is a very popular technique used in recommender systems for grouping objects that are similar in terms of people's taste (e.g., because you watched X, you may be interested in Y, etc.). Typical clustering algorithms are k-means, density based spatial clustering of applications with noise (DB-SCAN) and mean-shift, where a distance to a cluster is computed with the hope of reflecting a degree of anomaly (e.g., using a Euclidian distance and a cluster based local outlier factor that takes into account the cluster density).

Replicator techniques may also be used for purposes of anomaly detection. Such techniques generally attempt to replicate an input in an unsupervised manner by projecting the data into a smaller space (e.g., compressing the space, thus performing some dimensionality reduction) and then reconstructing the original input, with the objective of keeping the "normal" pattern in the low dimensional space. Example techniques that fall into this category include principal component analysis (PCA) (e.g., for linear models), multi-layer perceptron (MLP) ANNs (e.g., for non-linear models), and replicating reservoir networks (e.g., for non-linear models, typically for time series).

According to various embodiments, SLN process 248 may also use graph-based models for purposes of anomaly detection. Generally speaking, a graph-based model attempts to represent the relationships between different entities as a graph of nodes interconnected by edges. For example, ego-centric graphs have been used to represent the relationship between a particular social networking profile and the other profiles connected to it (e.g., the connected "friends" of a user, etc.). The patterns of these connections can then be analyzed for purposes of anomaly detection. For example, in the social networking context, it may be considered anomalous for the connections of a particular profile not to share connections, as well. In other words, a person's social connections are typically also interconnected. If no such interconnections exist, this may be deemed anomalous.

Figure 3:
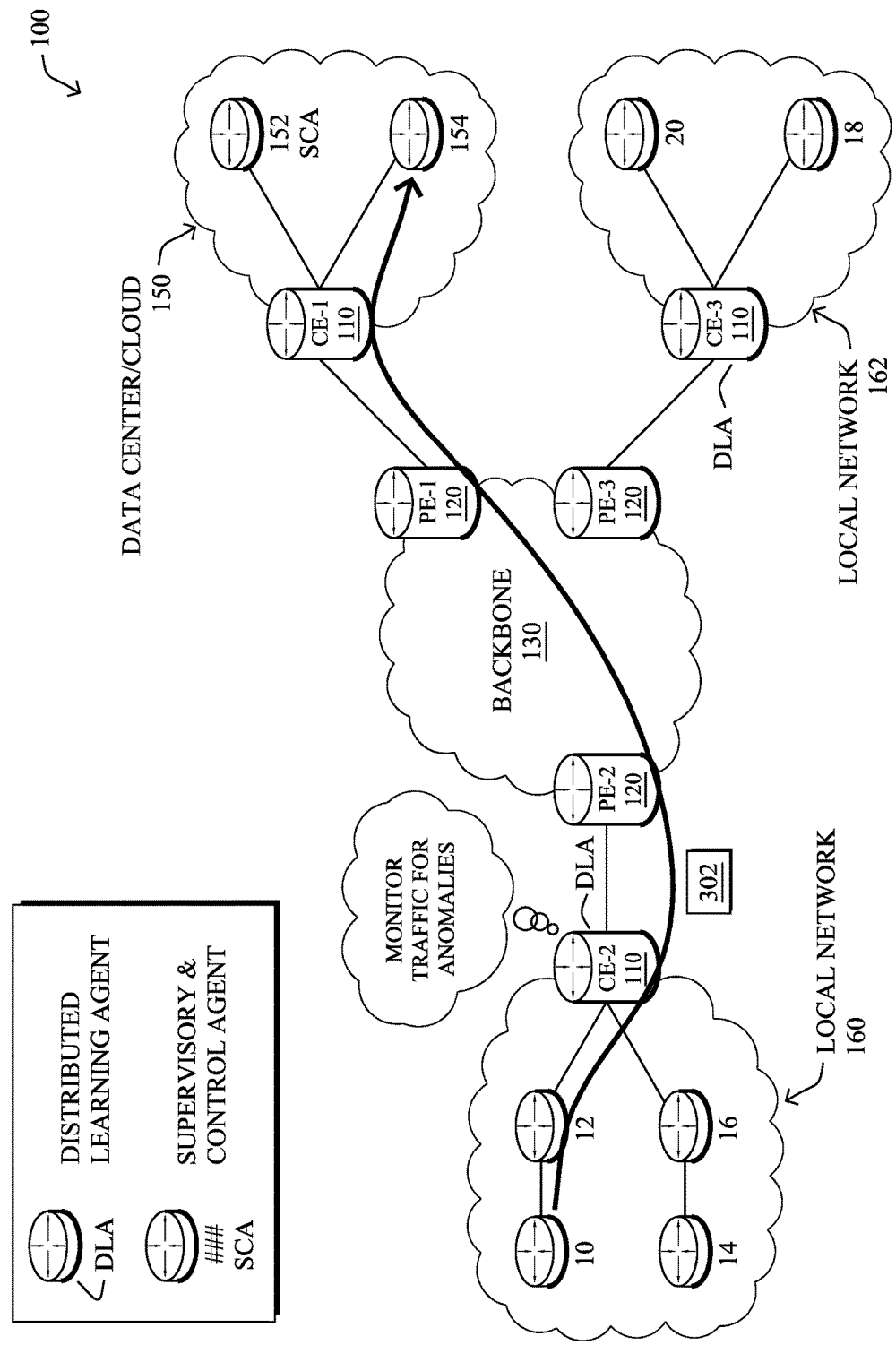
FIG. 3 illustrates an example self learning network (SLN) infrastructure.

An example self learning network (SLN) infrastructure that may be used to detect network anomalies is shown in FIG. 3, according to various embodiments. Generally, network devices may be configured to operate as part of an SLN infrastructure to detect, analyze, and/or mitigate network anomalies such as network attacks (e.g., by executing SLN process 248). Such an infrastructure may include certain network devices acting as distributed learning agents (DLAs) and one or more supervisory/centralized devices acting as a supervisory and control agent (SCA). A DLA may be operable to monitor network conditions (e.g., router states, traffic flows, etc.), perform anomaly detection on the monitored data using one or more machine learning models, report detected anomalies to the SCA, and/or perform local mitigation actions. Similarly, an SCA may be operable to coordinate the deployment and configuration of the DLAs (e.g., by downloading software upgrades to a DLA, etc.), receive information from the DLAs (e.g., detected anomalies/attacks, compressed data for visualization, etc.), provide information regarding a detected anomaly to a user interface (e.g., by providing a webpage to a display, etc.), and/or analyze data regarding a detected anomaly using more CPU intensive machine learning processes.

One type of network attack that is of particular concern in the context of computer networks is a Denial of Service (DoS) attack. In general, the goal of a DoS attack is to prevent legitimate use of the services available on the network. For example, a DoS jamming attack may artificially introduce interference into the network, thereby causing collisions with legitimate traffic and preventing message decoding. In another example, a DoS attack may attempt to overwhelm the network's resources by flooding the network with requests (e.g., SYN flooding, sending an overwhelming number of requests to an HTTP server, etc.), to prevent legitimate requests from being processed. A DoS attack may also be distributed, to conceal the presence of the attack. For example, a distributed DoS (DDoS) attack may involve multiple attackers sending malicious requests, making it more difficult to distinguish when an attack is underway. When viewed in isolation, a particular one of such a request may not appear to be malicious. However, in the aggregate, the requests may overload a resource, thereby impacting legitimate requests sent to the resource.

Botnets represent one way in which a DDoS attack may be launched against a network. In a botnet, a subset of the network devices may be infected with malicious software, thereby allowing the devices in the botnet to be controlled by a single master. Using this control, the master can then coordinate the attack against a given network resource.

DoS attacks are relatively easy to detect when they are brute-force (e.g. volumetric), but, especially when highly distributed, they may be difficult to distinguish from a flash-crowd (e.g., an overload of the system due to many legitimate users accessing it at the same time). This fact, in conjunction with the increasing complexity of performed attacks, makes the use of "classic" (usually threshold-based) techniques useless for detecting them. However, machine learning techniques may still be able to detect such attacks, before the network or service becomes unavailable. For example, some machine learning approaches may analyze changes in the overall statistical behavior of the network traffic (e.g., the traffic distribution among flow flattens when a DDoS attack based on a number of microflows happens). Other approaches may attempt to statistically characterizing the normal behaviors of network flows or TCP connections, in order to detect significant deviations. Classification approaches try to extract features of network flows and traffic that are characteristic of normal traffic or malicious traffic, constructing from these features a classifier that is able to differentiate between the two classes (normal and malicious).

As shown in FIG. 3, routers CE-2 and CE-3 may be configured as DLAs and server 152 may be configured as an SCA, in one implementation. In such a case, routers CE-2 and CE-3 may monitor traffic flows, router states (e.g., queues, routing tables, etc.), or any other conditions that may be indicative of an anomaly in network 100. As would be appreciated, any number of different types of network devices may be configured as a DLA (e.g., routers, switches, servers, blades, etc.) or as an SCA.

Assume, for purposes of illustration, that CE-2 acts as a DLA that monitors traffic flows associated with the devices of local network 160 (e.g., by comparing the monitored conditions to one or more machine-learning models). For example, assume that device/node 10 sends a particular traffic flow 302 to server 154 (e.g., an application server, etc.). In such a case, router CE-2 may monitor the packets of traffic flow 302 and, based on its local anomaly detection mechanism, determine that traffic flow 302 is anomalous. Anomalous traffic flows may be incoming, outgoing, or internal to a local network serviced by a DLA, in various cases.

In some cases, traffic 302 may be associated with a particular application supported by network 100. Such applications may include, but are not limited to, automation applications, control applications, voice applications, video applications, alert/notification applications (e.g., monitoring applications), communication applications, and the like. For example, traffic 302 may be email traffic, HTTP traffic, traffic associated with an enterprise resource planning (ERP) application, etc.

In various embodiments, the anomaly detection mechanisms in network 100 may use Internet Behavioral Analytics (IBA). In general, IBA refers to the use of advanced analytics coupled with networking technologies, to detect anomalies in the network. Although described later with greater details, the ability to model the behavior of a device (networking switch/router, host, etc.) will allow for the detection of malware, which is complementary to the use of a firewall that uses static signatures. Observing behavioral changes (e.g., a deviation from modeled behavior) thanks to aggregated flows records, deep packet inspection, etc., may allow detection of an anomaly such as an horizontal movement (e.g. propagation of a malware, etc.), or an attempt to perform information exfiltration.

Figure 4:
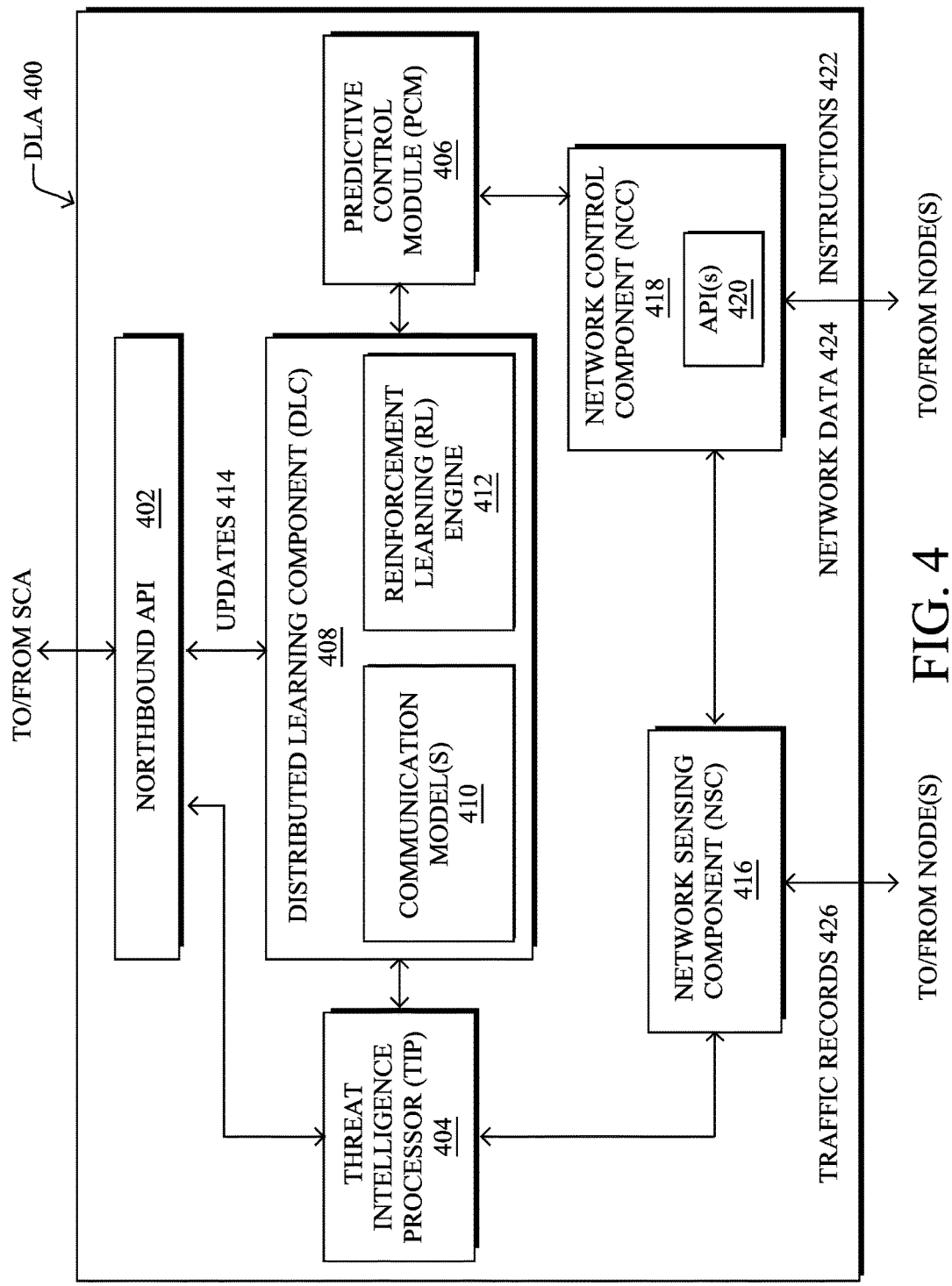
FIG. 4 illustrates an example distributed learning agent (DLA)

FIG. 4 illustrates an example distributed learning agent (DLA) 400 in greater detail, according to various embodiments. Generally, a DLA may comprise a series of modules hosting sophisticated tasks (e.g., as part of an overall SLN process 248). Generally, DLA 400 may communicate with an SCA (e.g., via one or more northbound APIs 402) and any number of nodes/devices in the portion of the network associated with DLA 400 (e.g., via APIs 420, etc.).

In some embodiments, DLA 400 may execute a Network Sensing Component (NSC) 416 that is a passive sensing construct used to collect a variety of traffic record inputs 426 from monitoring mechanisms deployed to the network nodes. For example, traffic record inputs 426 may include Cisco™ Netflow records, application identification information from a Cisco™ Network Based Application Recognition (NBAR) process or another application-recognition mechanism, administrative information from an administrative reporting tool (ART), local network state information service sets, media metrics, or the like.

Furthermore, NSC 416 may be configured to dynamically employ Deep Packet Inspection (DPI), to enrich the mathematical models computed by DLA 400, a critical source of information to detect a number of anomalies. Also of note is that accessing control/data plane data may be of utmost importance, to detect a number of advanced threats such as data exfiltration. NSC 416 may be configured to perform data analysis and data enhancement (e.g., the addition of valuable information to the raw data through correlation of different information sources). Moreover, NSC 416 may compute various networking based metrics relevant for the Distributed Learning Component (DLC) 408, such as a large number of statistics, some of which may not be directly interpretable by a human.

In some embodiments, DLA 400 may also include DLC 408 that may perform a number of key operations such as any or all of the following: computation of Self Organizing Learning Topologies (SOLT), computation of "features" (e.g., feature vectors), advanced machine learning processes, etc., which DLA 400 may use in combination to perform a specific set of tasks. In some cases, DLC 408 may include a reinforcement learning (RL) engine 412 that uses reinforcement learning to detect anomalies or otherwise assess the operating conditions of the network. Accordingly, RL engine 412 may maintain and/or use any number of communication models 410 that model, e.g., various flows of traffic in the network. In further embodiments, DLC 408 may use any other form of machine learning techniques, such as those described previously (e.g., supervised or unsupervised techniques, etc.). For example, in the context of SLN for security, DLC 408 may perform modeling of traffic and applications in the area of the network associated with DLA 400. DLC 408 can then use the resulting models 410 to detect graph-based and other forms of anomalies (e.g., by comparing the models with current network characteristics, such as traffic patterns. The SCA may also send updates 414 to DLC 408 to update model(s) 410 and/or RL engine 412 (e.g., based on information from other deployed DLAs, input from a user, etc.).

When present, RL engine 412 may enable a feed-back loop between the system and the end user, to automatically adapt the system decisions to the expectations of the user and raise anomalies that are of interest to the user (e.g., as received via a user interface of the SCA). In one embodiment, RL engine 412 may receive a signal from the user in the form of a numerical reward that represents for example the level of interest of the user related to a previously raised event. Consequently the agent may adapt its actions (e.g. search for new anomalies), to maximize its reward over time, thus adapting the system to the expectations of the user. More specifically, the user may optionally provide feedback thanks to a lightweight mechanism (e.g., 'like' or 'dislike') via the user interface.

In some cases, DLA 400 may include a threat intelligence processor (TIP) 404 that processes anomaly characteristics so as to further assess the relevancy of the anomaly (e.g. the applications involved in the anomaly, location, scores/degree of anomaly for a given model, nature of the flows, or the like). TIP 404 may also generate or otherwise leverage a machine learning-based model that computes a relevance index. Such a model may be used across the network to select/prioritize anomalies according to the relevancies.

DLA 400 may also execute a Predictive Control Module (PCM) 406 that triggers relevant actions in light of the events detected by DLC 408. In order words, PCM 406 is the decision maker, subject to policy. For example, PCM 406 may employ rules that control when DLA 400 is to send information to the SCA (e.g., alerts, predictions, recommended actions, trending data, etc.) and/or modify a network behavior itself. For example, PCM 406 may determine that a particular traffic flow should be blocked (e.g., based on the assessment of the flow by TIP 404 and DLC 408) and an alert sent to the SCA.

Network Control Component (NCC) 418 is a module configured to trigger any of the actions determined by PCM 406 in the network nodes associated with DLA 400. In various embodiments, NCC 418 may communicate the corresponding instructions 422 to the network nodes using APIs 420 (e.g., DQoS interfaces, ABR interfaces, DCAC interfaces, etc.). For example, NCC 418 may send mitigation instructions 422 to one or more nodes that instruct the receives to reroute certain anomalous traffic, perform traffic shaping, drop or otherwise "black hole" the traffic, or take other mitigation steps. In some embodiments, NCC 418 may also be configured to cause redirection of the traffic to a "honeypot" device for forensic analysis. Such actions may be user-controlled, in some cases, through the use of policy maps and other configurations. Note that NCC 418 may be accessible via a very flexible interface allowing a coordinated set of sophisticated actions. In further embodiments, API(s) 420 of NCC 418 may also gather/receive certain network data 424 from the deployed nodes such as Cisco™ OnePK information or the like.

The various components of DLA 400 may be executed within a container, in some embodiments, that receives the various data records and other information directly from the host router or other networking device. Doing so prevents these records from consuming additional bandwidth in the external network. This is a major advantage of such a distributed system over centralized approaches that require sending large amount of traffic records. Furthermore, the above mechanisms afford DLA 400 additional insight into other information such as control plane packet and local network states that are only available on premise. Note also that the components shown in FIG. 4 may have a low footprint, both in terms of memory and CPU. More specifically, DLA 400 may use lightweight techniques to compute features, identify and classify observation data, and perform other functions locally without significantly impacting the functions of the host router or other networking device.

As noted above, building behavioral analytics models is often challenging, especially at a particular site, for a number of reasons. One of these reasons relates to the potential heterogeneity of device behaviors thus leading to generic models where behaviors of various natures are effectively mixed. The immediate consequence of such approaches is the impact on detection efficacy.

The simplest approach to dealing with device behavior heterogeneity entails manually configuring clusters according to known matching criteria such as the subnet. Such an approach is acceptable as long as the addressing policy is compliant with strict rule (e.g., Subnet X dedicated to Point Of Sales, DHCP Poll address management using policies, etc.). When subnets get fragmented, this may result in the mixing of devices of different natures, thus leading to potential efficacy degradation. Rule-matching may be automated when coupled with identity service engine that support device profiling, in which case the IP address can be used to retrieve the device profile. Unfortunately such an approach cannot be used for analytics modeling at the edge of the network. Notably, a static policy is extremely cumbersome and has proven to introduce false classifications in many cases. In addition, it is also impractical in many cases to retrieve device profiles over the WAN.

Self Organizing Learning Topologies

The techniques herein provide a mechanism to compute clusters using a remote learning agent (e.g., a DLA) by grouping devices by index of similarity. In a first aspect, the DLA may generate a vector of features related to devices behavioral characteristics. The DLA may form device clusters using the feature vectors such as, e.g., using a tree or machine learning classifier, to group host devices according to their behaviors/characteristics. Other aspects of the techniques herein provide for the DLA to dynamically learn and forget cluster assignments, adapt the clusters in case of a device moving between clusters (e.g., due to a behavior change), and/or use feedback (e.g., from an SCA), to dynamically control the clustering strategies according to the impact of the clustering on computed models or local resources available. A further aspect provides for the DLA to propagate clusters information (e.g., device memberships, movements, etc.) to other DLAs and/or to a central SCA.

Specifically, according to one or more embodiments of the disclosure as described in detail below, a networking device at an edge of a network generates a first set of feature vectors using information regarding one or more characteristics of host devices in the network. The networking device forms the host devices into device clusters dynamically based on the first set of feature vectors. The networking device generates a second set of feature vectors using information regarding traffic associated with the device clusters. The networking device models interactions between the device clusters using a plurality of anomaly detection models that are based on the second set of feature vectors.

Illustratively, the techniques described herein may be performed by hardware, software, and/or firmware, such as in accordance with the SLN process 248, which may include computer executable instructions executed by the processor 220 (or independent processor of interfaces 210) to perform functions relating to the techniques described herein, e.g., in conjunction with routing process 244.

Operationally, the various participants in an SLN may compute what are referred to herein as Self Organizing Learning Topologies (SOLTs). Generally, a key aspect of a SOLT is the concept of device clusters, with each cluster comprising a set of host devices that share one or more common characteristics (e.g., subnet, configurations, applications, etc.). Such a topology comprises the various device clusters and their interactions. In various embodiments, an SLN may perform behavioral analytics and anomaly detection based on the interactions of the device clusters.

In some cases, the device clusters in a SOLT may be manually configured (e.g., based on static criteria). However, this approach is not only cumbersome, but also limits the ability of the system to appropriately observe and characterize "behaviors." Indeed, a variety of devices (with very different behaviors) could have been mixed into the same cluster, leading to inaccurate models. Accordingly, device clustering mechanisms are introduced herein that dynamically cluster host devices according to their behavioral similarities. In other words, as device characteristics and behaviors change, the system may adapt their cluster memberships accordingly. Doing so also allows the SLN to detect outliers in a device cluster (e.g., a behavior of a device behavior may appear as abnormal compared to its peers). Further, the SLN may perform clustering for both devices internal to the local branch network (e.g., where the DLA is deployed) and/or on the host/devices external to the site, with different level of refinements.

FIGS. 5A-5D illustrate an example of dynamic device clustering, according to various embodiments. Continuing the example of FIG. 3, assume that CE-2 and CE-3 at the edges of local/branch networks 160 and 162, respectively, are configured as DLAs. In turn, CE-2 and CE-3 may be in communication with a remote SCA 152, which provides supervision over the DLAs as part of an SLN architecture.

In various embodiments, a first component of the SOLT mechanism herein entails dynamically learning host behaviors from user traffic. To this end, the various DLAs or other networking devices may receive, at regular intervals of time, traffic flow-related data from various sources, such as Netflow or a similar mechanism, DPI, or the like, which the DLA may process locally (e.g., on the edge router itself). In one embodiment, the DLA may retrieve this data locally using a local programmatic interface. In another embodiment, the DLA may extract the information from any received packets using DPI or other packet analysis technique. In turn, the DLA may aggregate these data feeds into a first layer that comprises machine learning features. In some embodiments, the device may also augment the information with additional context, such as the geo-locations of the devices. For example, as shown, CE-2 may monitor traffic to and/or from the local nodes/host devices 10-16 in local/branch network 160 serviced by CE-2.

Once a DLA has captured the relevant device features, it may generate feature vectors related to the characteristics of the host devices and use the feature vectors to dynamically form device clusters. Note that the DLA may use different features to compute these vectors (e.g., for purposes of clustering the devices) than the features used to compute the behavioral models (e.g., for purposes of detecting anomalous behavior). In other words, the two tasks of clustering the host devices and detecting anomalous behavior may be completely orthogonal. In one example, such features may be a description of the volume and proportions associated with applications executed by a host, protocol-specific information (e.g., the type or characteristics of DNS requests performed by a host), the number of flows when the host was initiator/responder, etc. A DLA may also compute more complex features, if the features are considered representative of a host's behavior (e.g., statistical moments or other statistics).

In various embodiments, a DLA may continuously update its feature vectors in such a way so as not to capture sporadic variations of the device behaviors that may not be representative of the steady device behavior. In another embodiment, the DLA may employ a mechanism whereby the DLA "forgets" previously captured features, to adapt to behavioral changes of the host devices (e.g., due to the deployment of a new application, etc.). In a further embodiment, the DLA or other device may use a time based function to control when host features are purposely forgotten/discarded. For example, the device may use an exponential decay function to forget host features (e.g., (e.g., a decay function based on the feature value n and a parameter 1a that is 1 if the application is active at a given time).

Figure 5A:
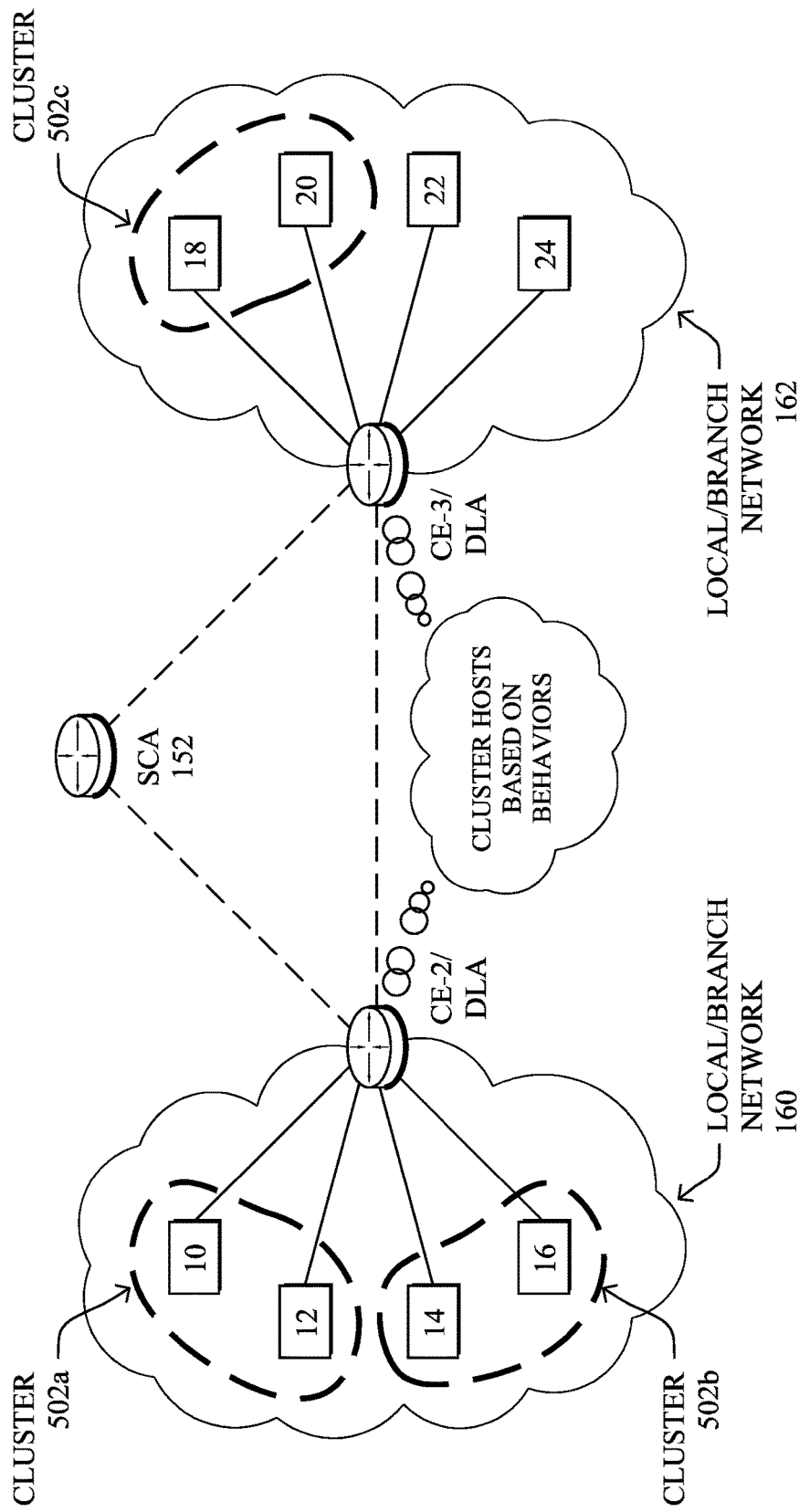
FIGS. 5A-5D illustrate an example of dynamic device clustering.

A second component of the SOLT mechanism is in charge of computing clusters (e.g., grouping devices according to the behavioral vectors listed above). For example, as shown in FIG. 5A, each DLA may form any number of device clusters based on their similarities. Notably, CE-2 and CE-3 may form a first cluster 502a that includes host is devices/nodes 10-12, a second cluster 502b that includes host devices/nodes 14-16, a third cluster 502c that includes host devices/nodes 18-20, etc.

The DLAs or other networking devices may use any of a variety of different approaches, to cluster the host devices. In some embodiments, the networking devices may form the clusters using a tree-based decision approach. In a tree-based decision approach, rules are specified according to which devices are classified in clusters that are dynamically computed on the fly. Rules may vary according to the nature of a device (such as an internal or external device), so as to provide various level of granularity. For example, external clusters may be further refined by country and region whereas internal clusters may use different set of rules such as subnets. In other embodiments, the networking devices may use a machine learning-based clustering approach, to form the device clusters according to their behaviors/characteristics. In one embodiment, a host may be assigned a single cluster. In another embodiment, the host may be associated with different clusters, in a weighted manner.

Figure 5B:
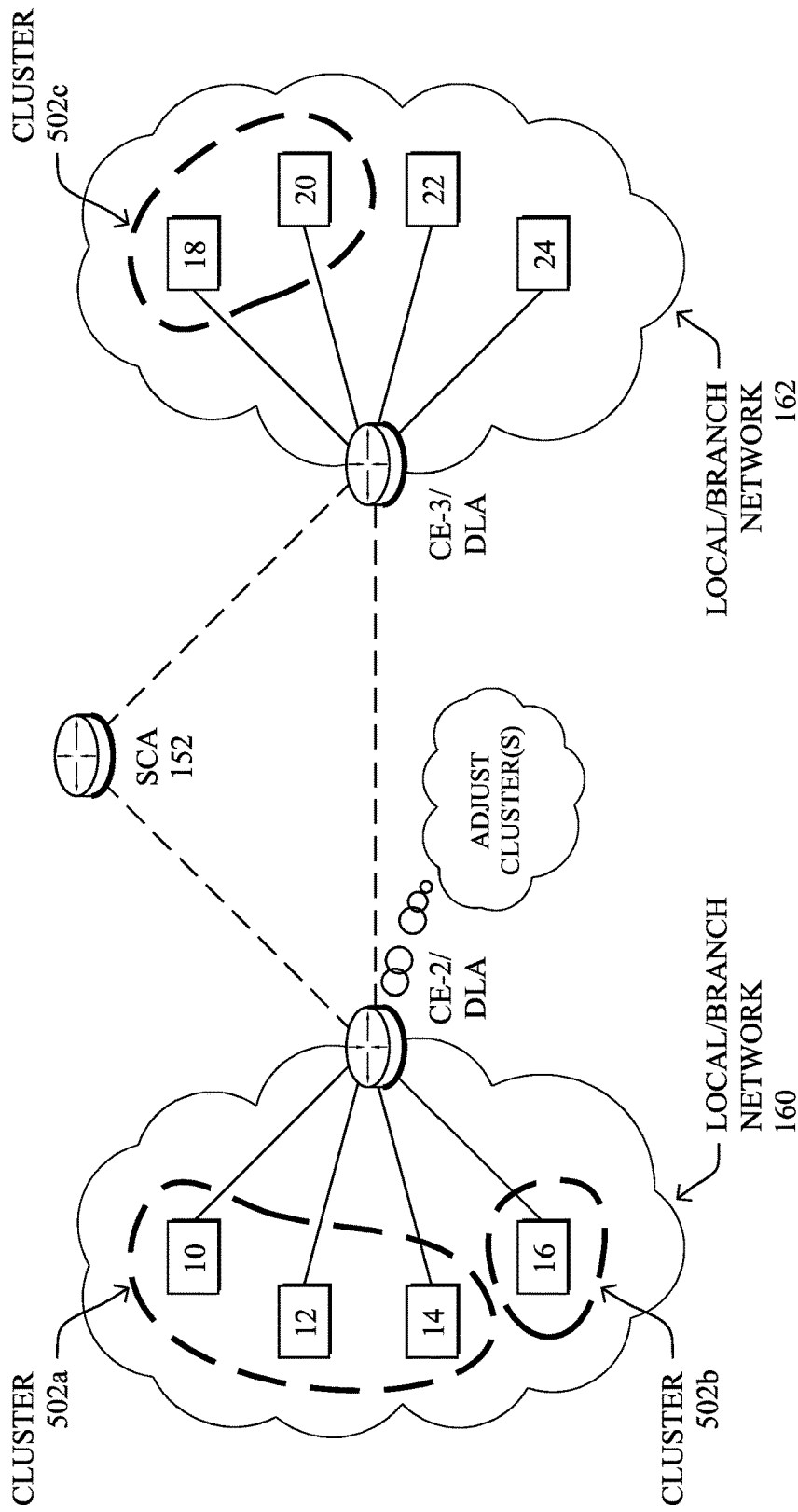

As shown in FIG. 5B, a DLA or other networking device may adjust cluster memberships dynamically. For example, assume that the behavior of host device 14 changes over time (e.g., the device begins exhibiting different traffic patterns, traffic frequencies, etc.). In such a case, the corresponding feature vector of observations regarding host device 14 will also change over time. In turn, CE-2 may adjust the cluster membership(s) of host device 14, accordingly. For example, CE-2 may migrate host device 14 from device cluster 502a to device cluster 502b, if the behavior of host device 14 more closely resembles those in device cluster 502b.

Care must be given to avoid a dramatic increase of the number of clusters. Indeed, a large increase in the number of clusters may negatively impact the machine learning-based models, thus affecting the resources required on the computing node such as a CPU constrained router/switch. To that end, a method is specified herein, to determine a set of criteria that control the formation of device clusters. In one embodiment, such a rule may be statically configured (e.g., At least X number of hosts belonging to a cluster must have been seen over the past Y hours). In another embodiment, the DLA or other clustering network device may locally adjust the cluster formation rules according to the cluster forming machine learning process (e.g., based on the CPU, memory, and other resources available). In yet another embodiment, the clustering device may use feedback regarding detected anomalies to adjust the cluster formation rules. Notably, if a rule is too strict, it may result in a large number of clusters that deteriorate the quality efficacy of the corresponding anomaly detection models. In yet another embodiment, as specified in greater detail below, a central controller such as an SCA may update and provide clustering policies to the clustering devices.

In further embodiments, a DLA or other clustering device may "forget" hosts over time, so as to avoid staled hosts in a device cluster. For example, if a host has not been seen after D-number of days, the clustering device may remove the host from memory and any associated device clusters. In another embodiment, mechanisms are specified so as to allow for clusters movements, while avoiding cluster oscillations. Particularly, behavioral changes of a host device may necessitate a migration of the host device between device clusters. In another embodiment, the DLA/clustering device may forget a particular host based on a feedback loop. For example, if device behavioral oscillations lead to model instability, this may trigger a feedback signal sent back to the clustering module to dynamically adapt the cluster change rules (e.g., to discourage inter-cluster movements so as to ensure model stability).

Figure 5C:
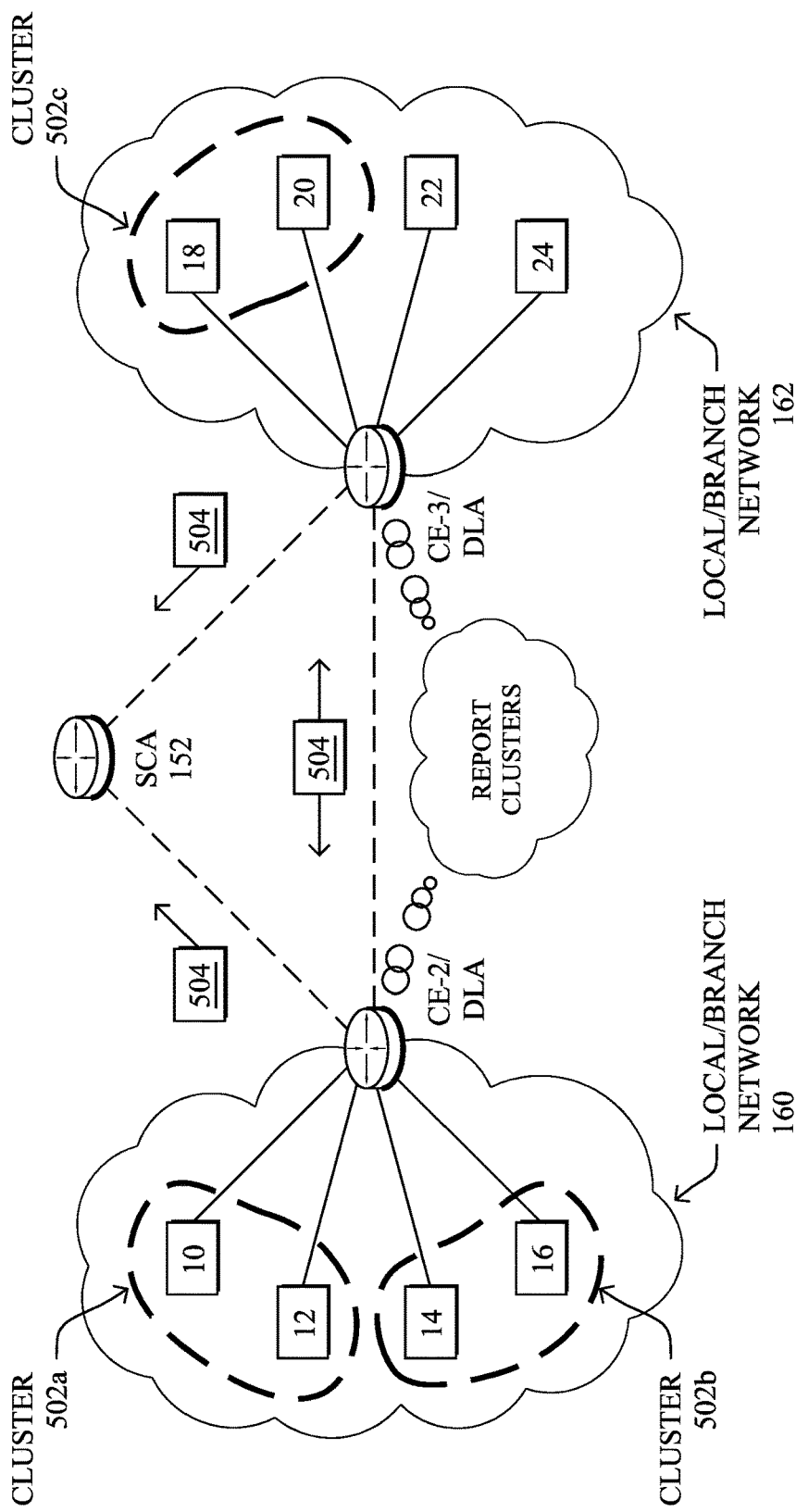
Figure 5D:
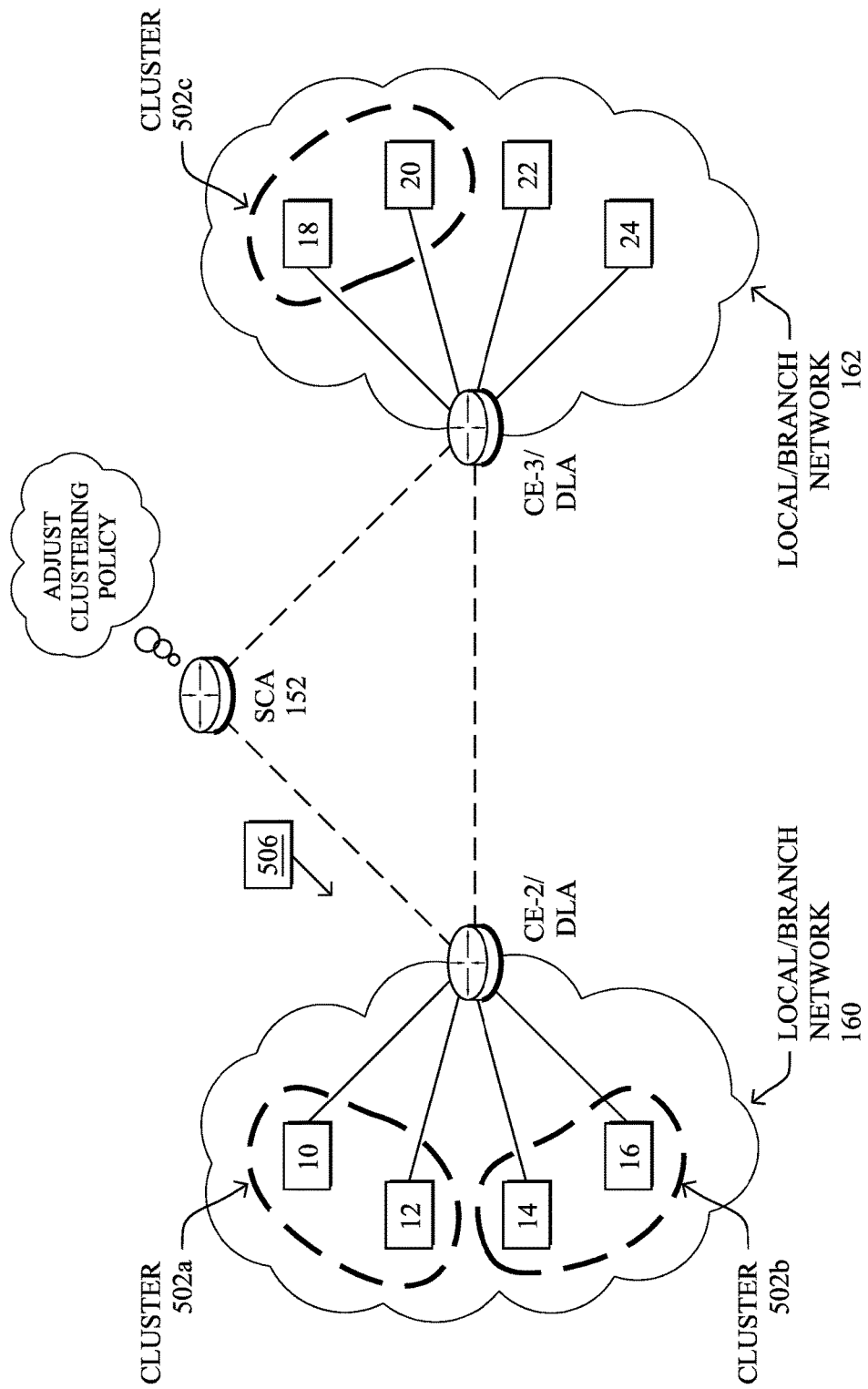

The third component of the SOLT mechanism allows for the propagation of the characteristics of the device clusters to a central engine (e.g., an SCA) and/or to other remote learning agents in the network (e.g., other DLAs). For example, as shown in FIG. 5C, a DLA or other clustering device may send a message 504 to SCA 152 and/or to the other DLAs in the network, to report the characteristics of its device clusters. Notably, information regarding the outcomes of the clustering process can help enhance the interpretation of any detected anomalies. In various embodiments, the DLA or other clustering device may send a message 504 in response to raising an anomaly, in response to a user request, in response to expiration of a configurable timer, when a significant change is detected in cluster, or at any other desired time. An example of such a message 504 is shown below and may be sent using a suitable protocol (e.g., Thrift, etc.): illustration:

```
struct SLN_CLUSTER_MEMBERSHIPS {
1: list<SLN_CLUSTER_MEMBERSHIP> memberships
}
where
struct SLN_CLUSTER_MEMBERSHIP {
1: i64 ipv4_addr // IP address
2: i64 ts // timestamp of the snapshot
3: i64 cluster_uid // reference to the cluster
4: i64 member_since_ts // timestamp of membership
5: SLN_EXTRA_INFO extra_info // optional additional information
}
```

DLAs may also learn the clusters computed by their peers, according to various embodiments (e.g., via messages 504). In one embodiment, CE-2 may require the clusters characteristics from a CE-3, when it sees flows originated/destined to devices 10-16 in clusters 502a-502b attached to CE-2. CE-2 may determine the address of CE-3 by making use of routing protocols so as to determine the router advertising the subnet matching the IP addresses of interest (e.g., OPSF LSA Type 1 or, if behind an area, Type 3, ISIS LSP, or a BGP peer). Notably, the clustering strategy may be specific to a DLA, or the DLA may simply employ different strategies based on whether a device is internal or external. Such information may be used to improve the clustering of remote hosts by retrieving the computed clusters from remote DLAs. In some cases, the exchange of cluster information between DLAs may present scaling issues, but can be used for specific purposes.

In some embodiments, SCA 152 may use the received information in messages 504 to adjust the clustering policies dynamically. In other words, SCA 152 or another central agent may adjust the set of rules/device features on which the DLAs base their clustering decisions. Notably, a given DLA may "see" traffic from devices of various natures. Thus, it may be advantageous for the SCA to observe the clusters' dynamics, correlate the dynamics with the devices seen/modeled by the DLA, and dynamically adjust the clustering policy. For example, SCA 152 may decide to upload a different clustering strategy (e.g. a more or less conservative strategy according to the nature of the devices being clustered). To that end, SCA 152 may send a clustering policy message 506 to any of the DLAs, to adjust their clustering policies. For example, message 506 may be a custom message called CLUSTER-POLICY( ) to upload/override the clustering strategies of the DLAs. In one embodiment, feedback signals are provided thanks to the specification of a custom message 506 from the SCA related to the anomaly quality. Such a signal can be used by the clustering engine to dynamically adapt the clustering strategy. For example, the DLA may locally adjust parameters to reduce the number of clusters or avoid too frequent movement between clusters, in response to receiving message 506.

Figure 6:
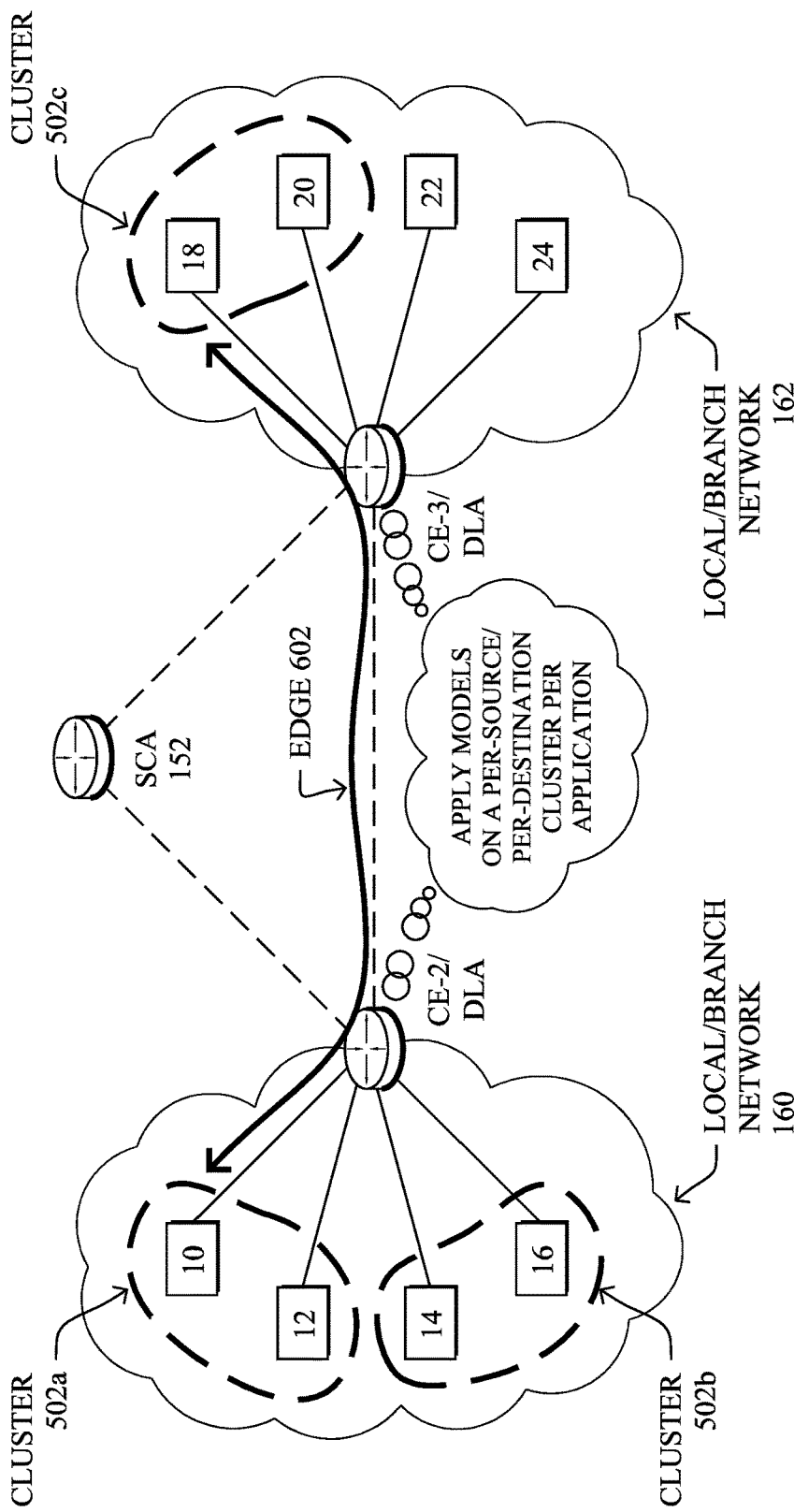
FIG. 6 illustrates an example of anomaly detection using device clusters.

Referring now to FIG. 6, the SLN may use the formed device clusters to perform anomaly detection. In addition to clustering the host devices, the second major task of the DLAs entails computing behavioral models between device clusters for groups of one or more applications. In some embodiments, the DLAs may compute the anomaly detection models using a hierarchical approach that includes three layers: 1.) application models (e.g., at the graph level), 2.) source cluster models, and 3.) source-destination models. Generally, an application model refers to all flows observed by the DLA for a given application regardless of the source and destination clusters (e.g. SSH, DNS, etc.). In contrast, a source model is used to model all flows per application for each source cluster (e.g., from cluster 502a and DNS traffic, from cluster 502b and DNS traffic, etc.). The last model type, source-destination, provides the highest granularity (e.g., cluster 502a to cluster 502c for DNS, etc.). In particular, the DLAs may compute and use behavioral models for different "edges" between clusters, such as edge 602 shown that represents application traffic between cluster 502a and cluster 502c. The modeling approach has been designed with great care in order to handle a high number of models yet with minimal footprint in terms of memory and CPU resources.

Figure 7A:
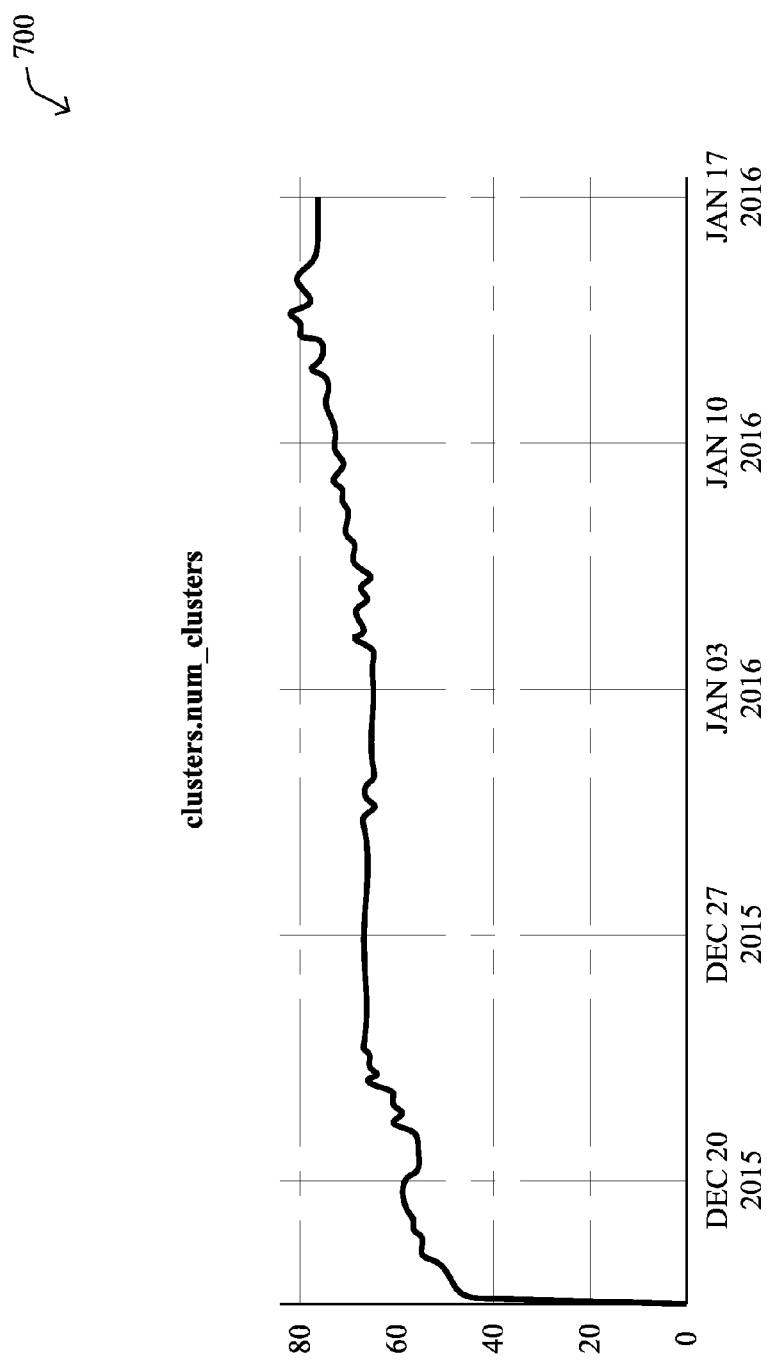
FIGS. 7A-7D illustrate example test plots using a device clustering mechanism.
Figure 7B:
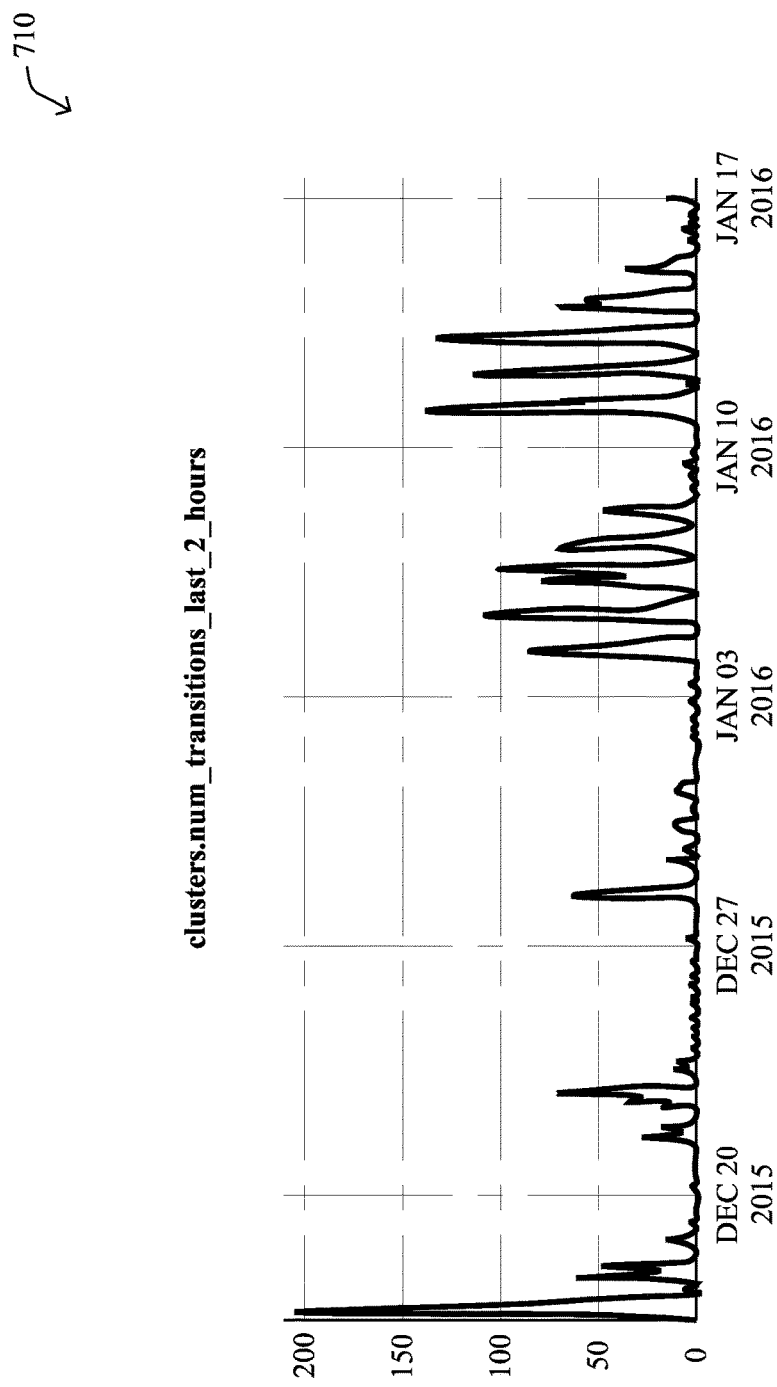
Figure 7C:
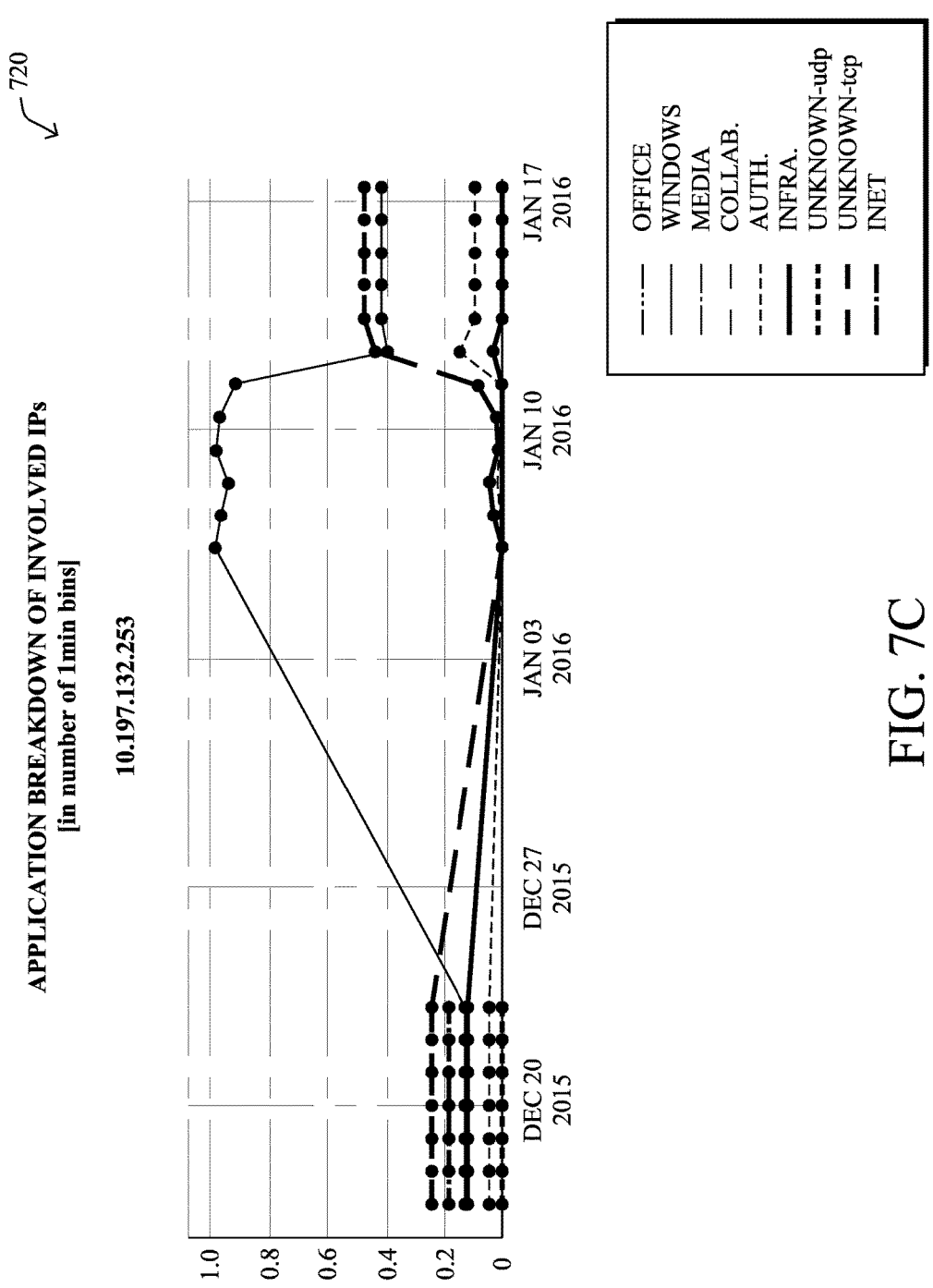
Figure 7D:
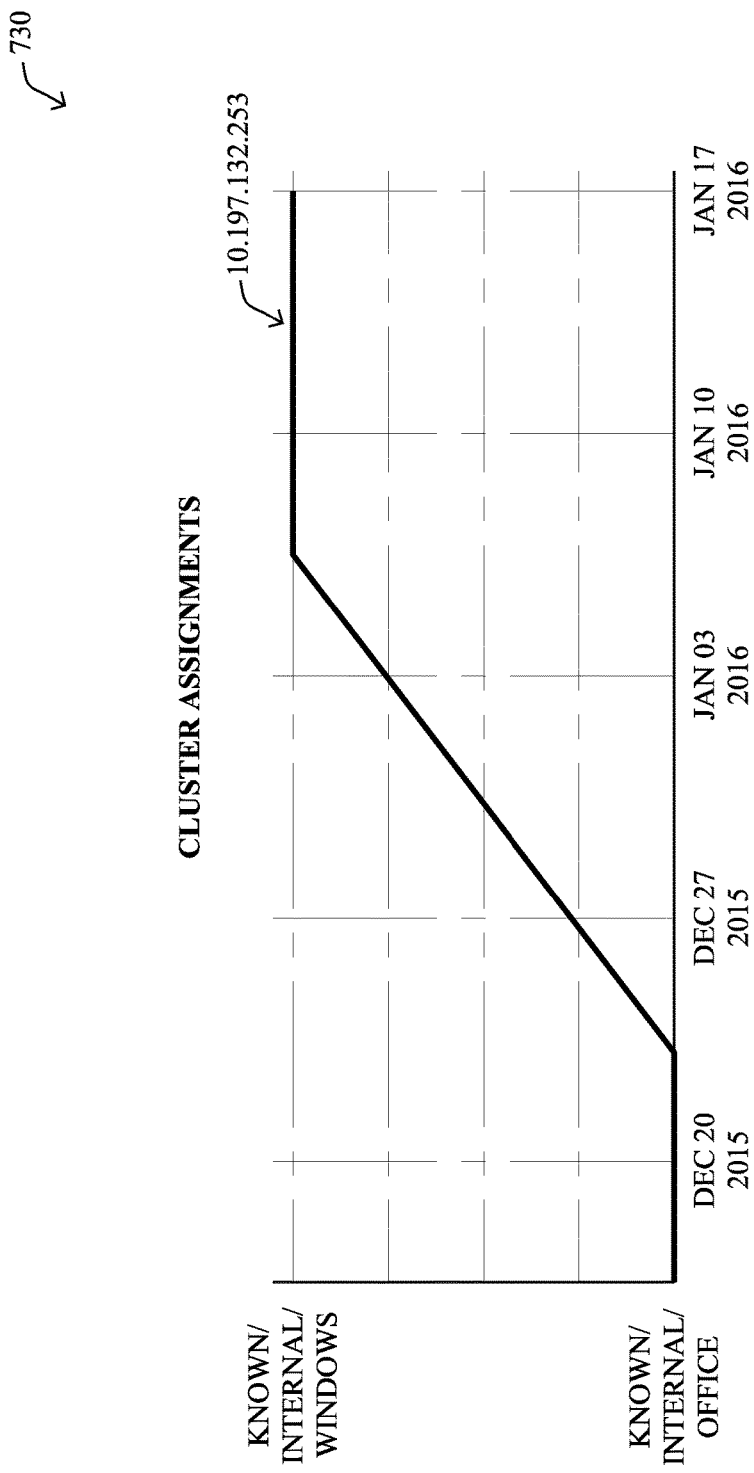

The plots illustrated in FIGS. 7A-7D are statistics from an actual implementation of the aforementioned clustering mechanism running on actual traces of network traffic. Specifically, plot 700 in FIG. 7A shows the evolution of the number of clusters over a 1-month period. Plot 710 in FIG. 7B shows the total number of transitions (host moving from one cluster to another) with a 2 hours moving window. As would be appreciated, the day/night patterns are very clear. Plots 720-730 in FIGS. 7C-7D illustrate plots of a host that changes behavior between the beginning and the end of the trace. In particular, as shown in FIG. 7D, the host first uses mostly the application "Office," then starts using "Windows" a lot. As a result, this host, which happens to be internal to the branch, switches from the known/internal/office cluster to the known/internal/windows cluster.

Automatic Assessment of Edge ML Models Quality Based on Dynamic DPI and Correlation (LinkAD)

Using the above techniques, hosts that exhibit similar behavioral patterns can be dynamically grouped into so-called clusters, which in turn allows for the slicing of their traffic at different abstraction levels (e.g., graph, cluster, and/or edge slicing). Relying on the last level of this very specific slicing, the SLN can also perform automatic correlation at several levels across the architecture, as measured on each "edge" (e.g., within a DLA and between several DLAs) and to identify and compare with typical Behavioral Edge Patterns (BEPs).

Thus, by exploiting the specific traffic slicing generated by the underlying host clustering mechanisms described above, a method is introduced to automatically compare several models that are considered similar across network elements. Thanks to these comparisons of BEPs across several network elements, the system can estimate the homogeneity versus heterogeneity of an edge. From these evaluations, this leads to two key functionalities:

1. Confidence estimation metric associated to each prediction, which can be a key element for the system user that quantifies the degree of confidence associated with each prediction made by the system. Indeed, each action that a user can take to mitigate the system reports (e.g., investigate an anomaly reports, modify the traffic of a specific points) might be costly. Thus, the ability to provide not only predictions reports but also confidence level in these predictions is a key aspect of the quality of the system.

2. Generation of a new kind of anomaly detection process, allowing for the identification of not only anomalous edge flows according to the usual traffic on one specific network element, but anomalous edge flows according to the traffic of several network elements.

The techniques herein introduce an edge-based mechanism to assess the level of confidence in the predictions of machine learning modules by exploiting the presence of an underlying behavioral clustering of the hosts. In some aspects, this confidence is provided by auto-correlating similar edge models built for similar edges on different DLAs. In further aspects, the techniques also provide for a new and complementary kind of anomaly detection based on global traffic behavior observed across all DLAs, instead of observed traffic on just one DLA.

Illustratively, the techniques described herein may be performed by hardware, software, and/or firmware, such as in accordance with the SLN process 248, which may include computer executable instructions executed by the processor 220 (or independent processor of interfaces 210) to perform functions relating to the techniques described herein, e.g., in conjunction with routing process 244.

Operationally, FIGS. 8A-8D illustrate an example of a device determining a measure of confidence in anomaly detection models, according to various embodiments. A first aspect of the edge-based mechanism involves a classification machine learning module (e.g., DLC 408) that models the network traffic once sliced by the SLN architecture at the level of the "edges" between "clusters," as described above. The module receives traffic data filtered by edges, and performs an automatic pattern classification. This generally entails correlating at the same time several dimensions (e.g., several stateless or stateful features) into clusters of data.

Another function of the system, the "dynamic clustering" described above, is already slicing the data into "clusters." This classification differs from this previous one used in two ways:
1. This procedure is performed after the dynamic device clustering process, and is applied directly on the "edge" data once the edges have been sliced and identified by the dynamic clustering mechanism.
2. In contrast with "dynamic clustering," which is considering the total network traffic within a DLA as a whole to slice it into "clusters" and "edges," this procedure is used to identify the typical behavioral patterns or classes of the traffic for each "edge". For instance it can identify that at a specific time frame the byte rate and the packet number are always high between the known/internal/collab and known/external/inet::windows clusters. However this correlation might be very different at a different time frame.

Said differently, the SLN may use two separate mechanisms: a first mechanism that dynamically groups host devices into device clusters based on their behaviors/characteristics and a second mechanism that evaluates the edges/interactions between the formed device clusters.

As with any other machine learning modules used by the SLN system on "edges," once the model is trained, it can provide a report to the SCA, identifying observed behavior as typical or anomalous. As mentioned previously, the clusters or classes and clustering processes described herein are referred to as Behavioral Edge Patterns (BEPs) and BEP-Classification (BEP-C).

One interesting aspect of BEP-C is that it can automatically assess the quality of the built model, just by using dedicated metrics (e.g., the silhouette), which basically evaluates how well the identified BEPs are separated, and thus exploitable. For example, if the BEPs are too interlaced, it may be difficult to associate a specific behavior with one identified BEP. This component is also in charge of computing such a metric on a regular basis in order to maintain an estimation of the learnt model quality. Finally, this method is generally very light in terms of modeling memory, and may simply store the centroid of the identified BEP. Thanks to its unique architecture, the system is able to build such a BEP for each of the main application groups as well as for each of the detected and active edges of the network topology.

This first component of the edge-based mechanism has been implemented using the combination of a PCA (Principal Component Analysis), a K-means, and a Mean-shift process. The PCA is a statistical analysis tool which allows reducing the dimension of the considered spaces. In the current mechanism, the PCA is used to compute a subset of features which will be feed directly to the next BEP-C processes. Then, a K-means is applied with an arbitrary big number of classes which will become the BEPs of the edge. This type of process presents the advantage of being relatively cheap in terms of CPU consumption at the cost of the a priori number of classes. Finally, a mean-shift process is applied on the results. The mean-shift process is able to automatically converge on a sub-optimal number of classes. It is a lot more CPU expensive that the K-means process and is thus applied just after the K-means, mainly to reduce the number of identified BEPs.

Figure 8A:
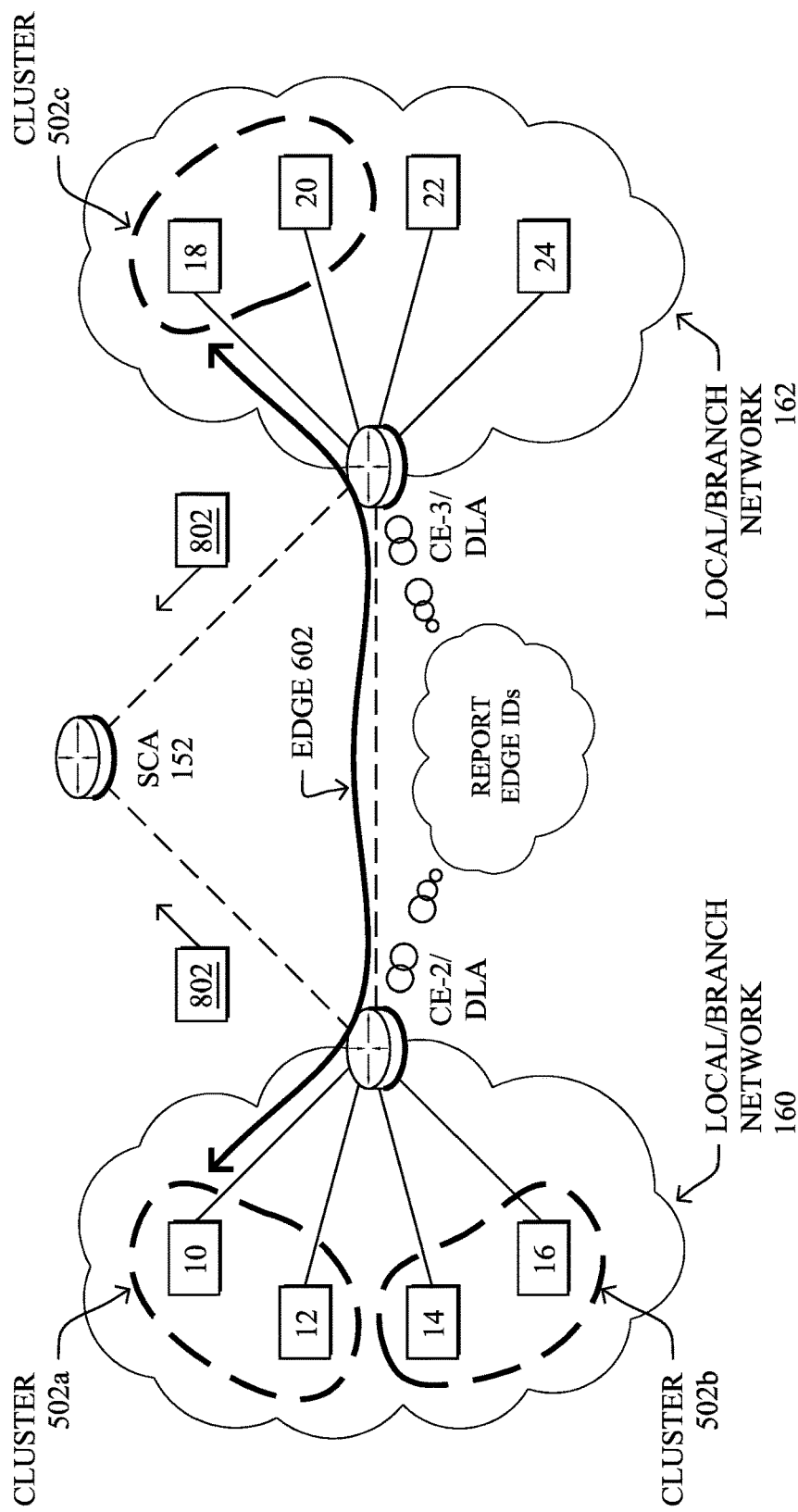
FIGS. 8A-8D illustrate an example of a device determining a measure of confidence in anomaly detection models.

As shown in FIG. 8A, the SCA (e.g., SCA 152) may be in charge of collecting all the edges names sent by the DLAs. For example, the DLAs may send edge ID messages 802 to SCA 152, to report the edge names associated with the cluster edges, such as edge 602. In some cases, a message 802 may be a custom IPv4 or IPv6 message called Graph_Edges_Names( ) that is sent by the DLA to SCA 152, to provide the exhaustive list of all detected and actives edges names identifying the characteristics of the traffic on these edges. This is needed so SCA 152 can start to identify across the different DLAs (e.g., CE-2, CE-3, etc.) similar edges for which the BEP models can be compared.

Edge names/identifiers can take any number of different forms. For example, an edge name conveyed via messages 802 may be a simple tuple of 2 strings containing the edge source cluster name and the edge destination cluster name. Cluster names can also take any number of forms and may indicate their respective characteristics. For example, assume that hosts in a first cluster in an internal network receive Internet/HTTP traffic from a cluster of external hosts located in California. In such a case, the edge name/ID may be "known/internal/Inet-known/external/http/US/California," by simply linking the respective cluster names. Other, more complex, cluster and edge naming schemes can also be used in other embodiments.

In some cases, a DLA may send a message 802 to the SCA each time the DLA determines that the detected clusters are stable enough (e.g., after the learning period) or that the previously sent message has timed out. Each DLA may model a large number of such edges, but the overall message is very easily compactable as all the clusters name can simply comprise a combination of word taken in a very small dictionary. For example, each edge could be encoded in a maximum of 20 octets (e.g., 1 octet max per word in the cluster names).

Figure 8B:
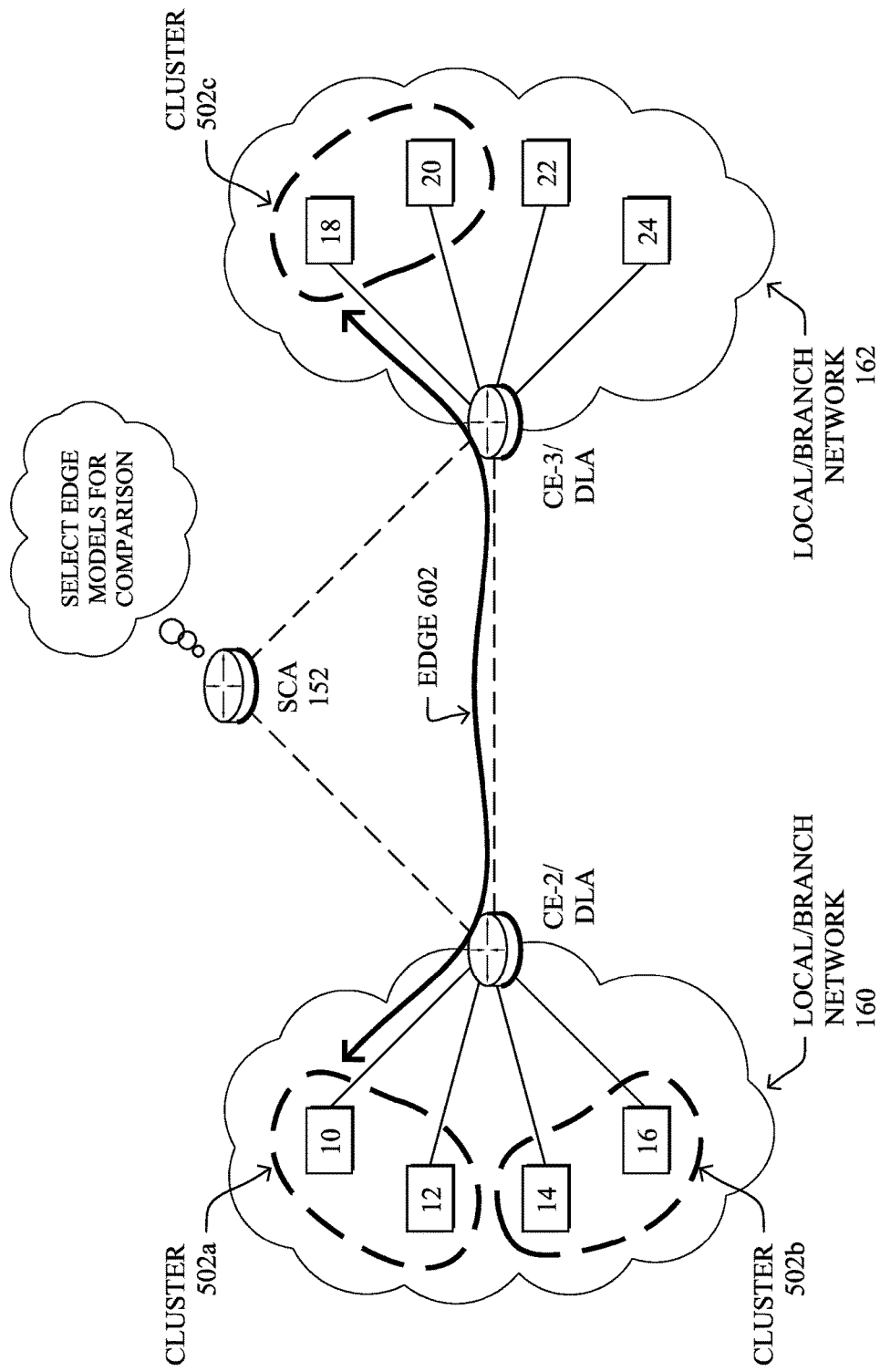

As shown in FIG. 8B, the SCA may select edge models for comparison by identifying the edges that are most likely to exhibit common behaviors. The idea here is to select or filter out the edges that can be used to compare BEP models across several DLAs. This component is responsible for the integration of external expertise and a priori knowledge on potential edge characteristics that might be used to assess their level of similarity. For instance, an expert can indicate that every edge between clusters of Windows-based hosts should behave in a similar way. On the contrary, the expert may also indicate that similarities between edges involving video conferencing traffic aren't relevant. In other words, the SCA may receive expert information via a user interface that captures existing knowledge about edges and cluster interactions, to dynamically filter those BEPs that should be compared across DLAs.

The filter may use heuristics that will filter the edge names tuples based on general network rules, as well as on specific business rules. For instance, the user might know that some internal proprietary applications are supposed to exhibit very similar behaviors, either in principle or by policy. Similarly, some other application might be too specific to exhibit common/comparable behaviors across all the DLAs. These rules can be entered into the system simply as name filters like [known/internal/app24;*=comparable] or [known/internal/skype; known/internal/skype=not_comparable]. Once the SCA applies these heuristics, the SCA can identify a subset of edges names of edges that should be compared across DLAs. Thus, this functionality allows the SCA to identify which detailed BEP models constructed on the individual DLAs should be compared.

Figure 8C:
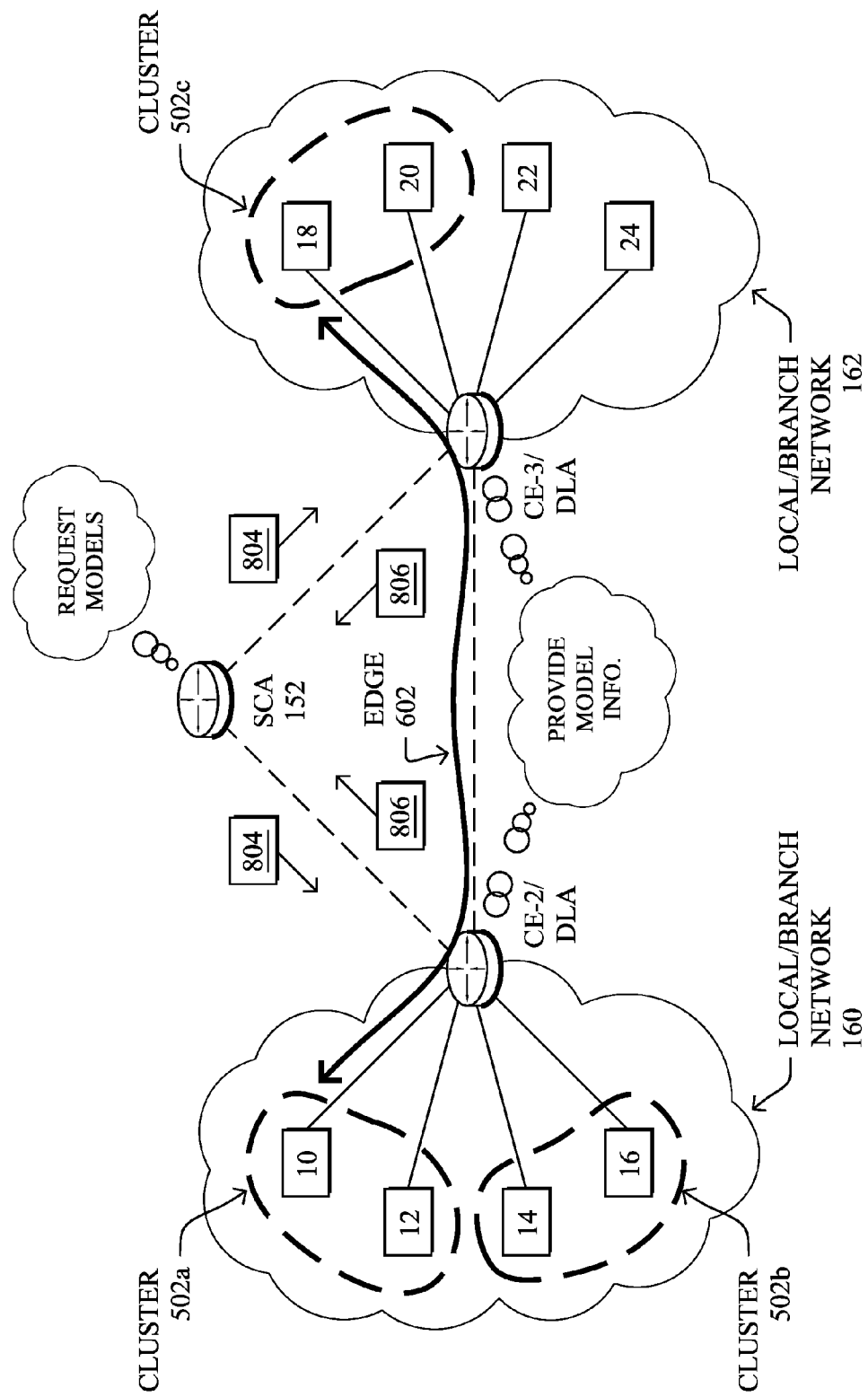

As shown in FIG. 8C, SCA 152 may send a custom message 804 to the DLAs, to request the selected BEPs for comparison, as modeled by each DLA. Messages 804 may be, for example, custom IPv4 or IPv6 multicast messages called Get_Graph_BEP_Models( ). Such a message may include the subset of encoded edges names that are required to provide their own detailed BEP models.

In response to receiving a model request message 804, a receiving DLA may return a response message 806 back to SCA 152 that includes model information regarding its BEP models. For example, message 806 may be a custom IPv4 or IPv6 unicast message called Graph_BEP_Models( ) that includes, for all of the edges and corresponding application groups specified in the Get_Graph_BEP_Models( ) message 802, any or all of the following:

The minimal descriptions of each model

The set of used features and the PCA parameters on which the models were initially built. When using a PCA mechanism, the results can be projected into the initial dimension. Basically, the PCA realizes a linear transformation of the considered space into a reduced one such that $D_x \rightarrow D_y$ (with $|x|>|y|$). So, in most cases, this transformation is reversible when knowing the PCA parameters and the results found in $D_y$ can also be projected back into into $D_x$.

The quality metrics computed for each model (e.g., the silhouette).

Figure 8D:
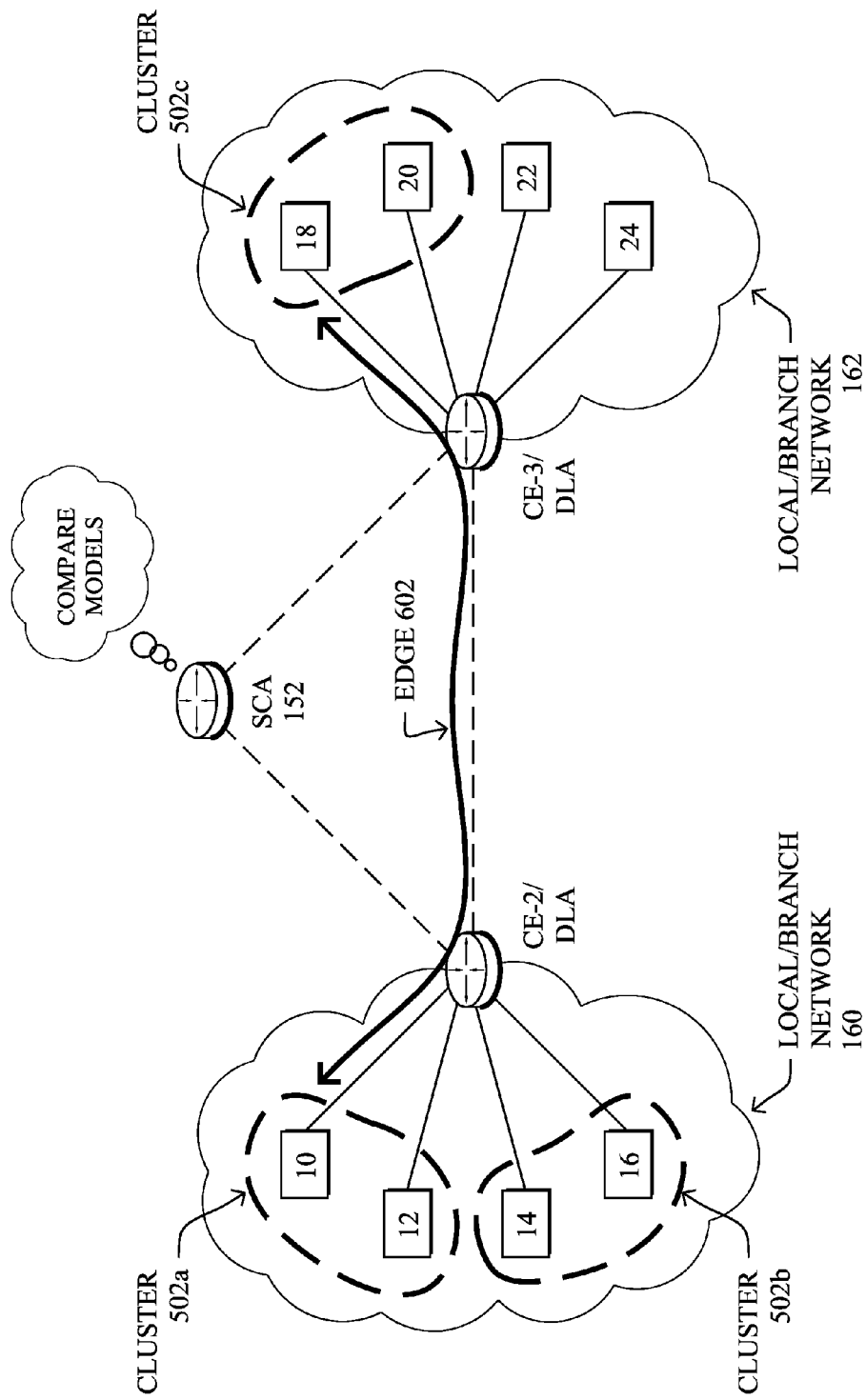

As shown in FIG. 8D, SCA 152 may use the received messages 804 to compare the BEP models of edges deemed similar. For example, SCA 152 may compare the models for the same edge (e.g., edge 602), but from different DLAs (e.g., CE-2 and CE-3). Basically, each sent model may include a set of centroids in the dimensions considered by the BEP-C processes. These dimensions will be identical across all DLAs thanks to the re-projection detailed above. Thus, for each considered edge, the SCA may receive n-number of BEP models from n-number of different DLAs. These models represent the traffic behavioral patterns identified between the same clusters, but by different DLAs.

The SCA may compute statistical metrics about the characteristics of the models' centroids, such as a standard similarity distance (e.g., a basic Euclidian distance or a more advanced distance). For instance, SCA 152 may determine and analyze the average center ($M_{CP}$), the average size of the centroid ($M_{SC}$), and the average distance of the centroid to the average center ($M_{DC}$). These metrics allow the SCA to determine how consistent the BEP models are on the same edge across several DLAs.

There are three possible outcomes of the comparison between the BEP models:

1. All the BEP models are very close (for instance because $M_{DC}$ is small enough and $M_{DC}<M_{SC}$ but other classic clustering metrics/criteria might be used) which tends to prove that the observed behaviors are quite stable and reproducible. This information may be used to reinforce the confidence in this particular set of models. Moreover, a meta model based on the average observed behavior can be produced and provided to the user to illustrate the general behavior observed across all DLAs.
2. A majority of the BEP models are really comparable ($M_{DC}$ is too big or $M_{DC}>>M_{SC}$, etc.). In such a case, this information may be used directly to reduce the confidence of these models and potentially filter out the predictions/decisions (optimization rules, anomaly detections) based on these models which might have been reported to the users. Two solutions are available: either these reports are filtered from a user entirely or are presented in conjunction with a very low confidence score.
3. A majority of BEP models are very close, as in the 1$^{st}$ case, but some of the models are not (e.g., their centroid distance to the average centroid is too big). In various embodiments, this can be reported as a new kind of anomaly to the users: one that indicates that a specific DLA (or small subset of DLAs) on a particular edge is not behaving consistent with the observed and predicted behaviors of the other DLAs. In other words, thanks to the combination of dynamic clustering on the DLAs and the model comparison mechanisms, the system is able to identify a general BEP applied to a specific edge, and to detect abnormal variation of a generally stable behavior.

Figure 9:
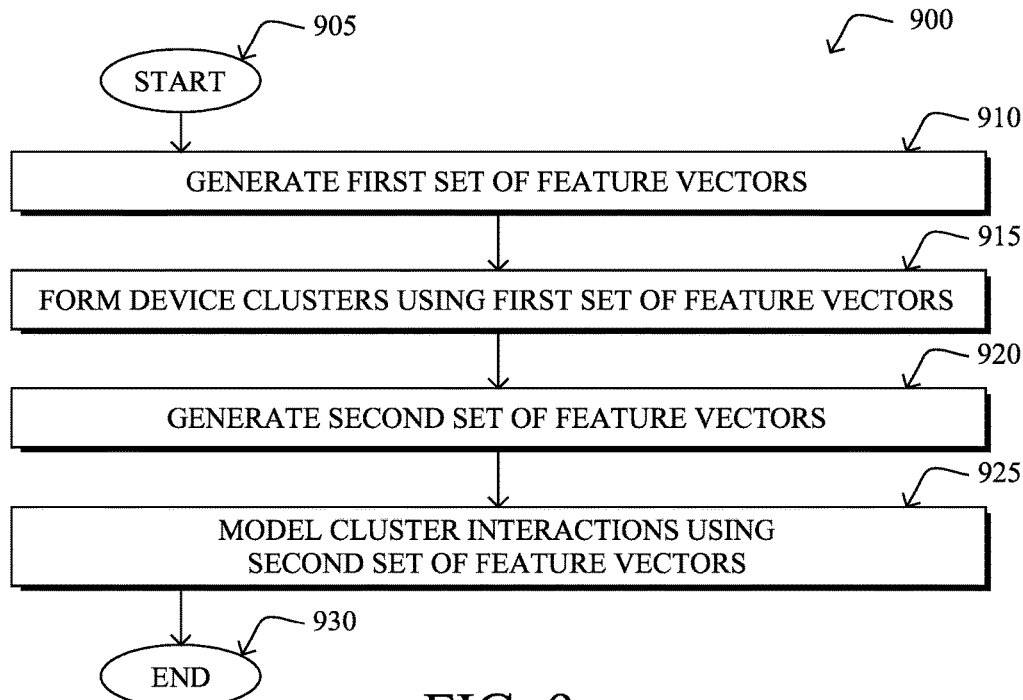
FIG. 9 illustrates an example simplified procedure for modeling device clusters.

FIG. 9 illustrates an example simplified procedure for modeling device clusters, in accordance with the embodiments herein. Generally, procedure 900 may be performed by a specialized networking device executing stored instructions (e.g., device 200 executing SLN process 248), such as a router or other networking device at the edge of a local/branch network. Procedure 900 may start at step 905 and continues on to step 910 where, as described in greater detail above, the device may generate a first set of feature vectors regarding the characteristics/behaviors of the host devices in the network. For example, the networking device may analyze traffic records (e.g., from Netflow or a similar mechanism, perform DPI on packets to/from the hosts, or perform other techniques, to generate the first set of feature vectors.

At step 915, as detailed above, the networking device may form the host devices into host clusters based on the first set of feature vectors. Generally, this may entail forming device clusters of devices that exhibit similar characteristics/behaviors. In various embodiments, the networking device may do so dynamically. For example, the networking device may adjust the cluster memberships in response to their changing behaviors. In various embodiments, the networking device may also form the device clusters based on a time function (e.g., to age out stale host members), a policy (e.g., to prevent an excessive amount of device clusters), feedback regarding detected anomalies, or other such information. In various cases, a given host device may belong to one device cluster or multiple device clusters.

At step 920, the networking device may generate a second set of feature vectors, as described in greater detail above. These feature vectors may differ, in some cases, from the first set of feature vectors used to form the device clusters. For example, consider the case in which the networking device clusters Windows-based host devices in the local network into a single device cluster. In turn, the networking device may gather information about the behavior of the cluster such as application traffic associated with the cluster, destinations and/or sources of traffic associated with the cluster, the identity of another cluster that interacts with the device cluster, etc.

At step 925, as detailed above, the networking device may model interactions between the device clusters using the second set of feature vectors. Notably, after slicing the total amount of observation data available to the networking device into device clusters, the networking device may train any number of different models to assess the behaviors of the device clusters. For example, the device may train anomaly detection models at the graph, cluster, or edge level, to assess the behaviors of the devices in the cluster. Procedure 900 then ends at step 930.

Figure 10:
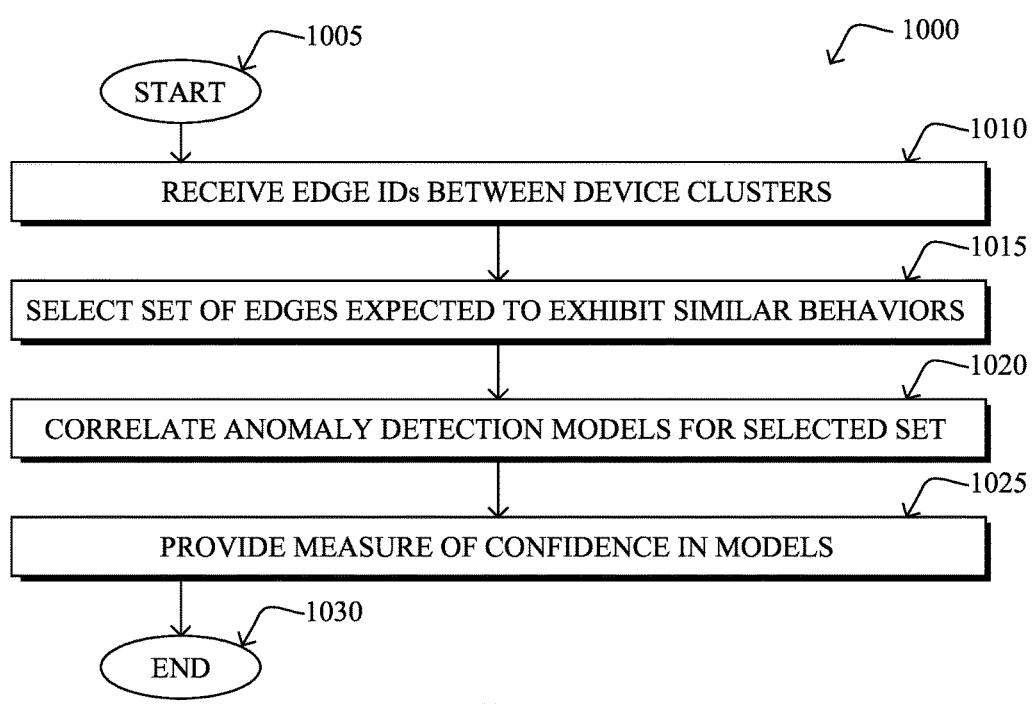
FIG. 10 illustrates an example simplified procedure for providing a measure of confidence in anomaly detection models.

FIG. 10 illustrates an example simplified procedure for providing a measure of confidence in anomaly detection models, in accordance with various embodiments herein.

Generally, procedure 1000 may be performed by a specialized networking device executing machine instructions (e.g., a device 200 executing SLN process 248), such as an SCA or other supervisory networking device. Procedure 1000 may start at step 1005 and continues on to step 1010 where, as described in greater detail above, the device may receive edge identifiers (IDs) for edges between device clusters. For example, the device may receive edge identifiers from DLAs configured to form device clusters based on the behaviors/characteristics of the host devices in their local networks.

At step 1015, as detailed above, the device may select cluster edges that are expected to exhibit similar behaviors. For example, if device clusters communicate the same or similar traffic, have similar characteristics, etc., the device may determine that the models for the similar edges should also demonstrate a corresponding degree of similarity. In some cases, the device may identify edges that overlap, but from opposing perspectives (e.g., traffic is exchanged between device clusters A and B on different branch networks and the DLAs of the networks each assess the traffic separately).

At step 1020, the device may correlate the anomaly detection models of the selected edges, to compute a measure of confidence in the models, as described in greater detail above. Notably, the device may compare the BEP models, to determine how similar the models are. For example, the device may analyze and compare the average center, average centroid size, and/or the average centroid distance to the average center, to assess how similar the models are. In some cases, such as when only a subset of the assessed models exhibits dissimilarity with the other models, the device may determine that this condition is an anomaly in and of itself.

At step 1025, the device may provide the measure of confidence in the selected models, as described in greater detail above. For example, the device may provide the measure of confidence to a user interface, such as in conjunction with reporting an anomaly detected by one or more of the models. Doing so may indicate to the user whether the detected anomaly is reliable and should be acted on accordingly. Procedure 1000 then ends at step 1030.

It should be noted that while certain steps within procedures 900-1000 may be optional as described above, the steps shown in FIGS. 9-10 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 900-1000 are described separately, certain steps from each procedure may be incorporated into each other procedure, and the procedures are not meant to be mutually exclusive.

The techniques described herein, therefore, allow for automatic configuration of the system and more efficient modeling of behaviors. Furthermore, related anomalies are significantly more relevant to the user since their context related (anomaly of a host related to its peers as opposed to a larger more heterogeneous community). Additional aspects of the techniques herein increase the level of trust in the system by determining a measure of confidence in the models and also provide for the detection of a new type of anomaly across a set of DLAs with respect to their models.

While illustrative embodiments that provide for anomaly detection in a network are shown and described herein, it is to be understood that various other adaptations and modifications may be made within the spirit and scope of the embodiments herein. For example, while certain embodiments are described herein with respect to using certain models for purposes of anomaly detection, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
generating, by a networking device at an edge of a network, a first set of feature vectors using information regarding one or more characteristics of host devices in the network;
forming, by the networking device, the host devices into device clusters dynamically based on the first set of feature vectors;
generating, by the networking device, a second set of feature vectors using information regarding traffic associated with the device clusters;
modeling, by the networking device, interactions between the device clusters using a plurality of anomaly detection models that are based on the second set of feature vectors; and
adjusting, by the networking device, the device clusters in response to feedback from a supervisory device regarding one or more anomalies detected by the one or more anomaly detection models.

2. The method as in claim 1, further comprising:
reporting, by the networking device, the device clusters to a supervisory device.

3. The method as in claim 1, further comprising:
receiving, at the networking device, a clustering policy from a supervisory device, wherein the networking device forms the device clusters based in part on the received clustering policy.

4. The method as in claim 1, wherein a particular host device belongs to a plurality of device clusters.

5. The method as in claim 1, further comprising:
adjusting, by the networking device, the device clusters based on a time function.

6. The method as in claim 1, further comprising:
adjusting, by the networking device, the device clusters based on a change in the first set of feature vectors that corresponds to a behavioral change of one or more of the host devices.

7. The method as in claim 1, further comprising:
reporting, by the networking device, edge identifiers to a supervisory device, wherein a particular edge identifier represents an interaction between two or more of the device clusters, wherein the supervisory device is configured to use the edge identifiers to select a set of edges expected to exhibit similar behaviors; and providing, by the networking device, information regarding one or more of the anomaly detection models to the supervisory device based on the set of edges selected by the supervisory device, wherein the supervisory device is configured to use the information regarding the one or more of the anomaly detection models to provide a measure of confidence in the models.

8. The method as in claim 1, wherein the networking device is a router at the edge of the network, and wherein the characteristics of a particular host device comprise one or more of: a location of the particular host device, an application executed by the particular host device, or a device configuration of the particular host device.

9. An apparatus, comprising:
one or more network interfaces to communicate with a network;
a processor coupled to the network interfaces and configured to execute one or more processes; and
a memory configured to store a process executable by the processor, the process when executed operable to:
generate a first set of feature vectors using information regarding one or more characteristics of host devices in the network;
form the host devices into device clusters dynamically based on the first set of feature vectors;
generate a second set of feature vectors using information regarding traffic associated with the device clusters; and
model interactions between the device clusters using a plurality of anomaly detection models that are based on the second set of feature vectors
adjust the device clusters based on one or more of: a time function, a change in the first set of feature vectors that corresponds to a behavioral change of one or more of the host devices, or feedback from a supervisory device regarding one or more anomalies detected by the one or more anomaly detection models.

10. The apparatus as in claim 9, wherein the first set of feature vectors differs from the second set of feature vectors.

11. The apparatus as in claim 9, wherein the process when executed is further operable to:
report edge identifiers to a supervisory device, wherein a particular edge identifier represents an interaction between two or more of the device clusters, wherein the supervisory device is configured to use the edge identifiers to select a set of edges expected to exhibit similar behaviors; and
provide information regarding one or more of the anomaly detection models to the supervisory device based on the set of edges selected by the supervisory device, wherein the supervisory device is configured to use the information regarding the one or more of the anomaly detection models to provide a measure of confidence in the models.

12. The apparatus as in claim 9, wherein the apparatus is a router at an edge of the network, and wherein the characteristics of a particular host device comprise one or more of: a location of the particular host device, an application executed by the particular host device, or a device configuration of the particular host device.

13. A tangible, non-transitory, computer-readable medium storing program instructions that, when executed by a device in a network perform a process comprising:
generating a first set of feature vectors using information regarding one or more characteristics of host devices in the network;
forming the host devices into device clusters dynamically based on the first set of feature vectors;
generating a second set of feature vectors using information regarding traffic associated with the device clusters;
modeling interactions between the device clusters using a plurality of anomaly detection models that are based on the second set of feature vectors; and
adjusting the device clusters in response to feedback from a supervisory device regarding one or more anomalies detected by the one or more anomaly detection models.

14. The tangible, non-transitory, computer-readable medium as in claim 13, wherein the first set of feature vectors differs from the second set of feature vectors.

15. The tangible, non-transitory, computer-readable medium as in claim 13, wherein the process further comprises:
reporting edge identifiers to a supervisory device, wherein a particular edge identifier represents an interaction between two or more of the device clusters, wherein the supervisory device is configured to use the edge identifiers to select a set of edges expected to exhibit similar behaviors; and
providing information regarding one or more of the anomaly detection models to the supervisory device based on the set of edges selected by the supervisory device, wherein the supervisory device is configured to use the information regarding the one or more of the anomaly detection models to provide a measure of confidence in the models.

16. The tangible, non-transitory, computer-readable medium as in claim 13, wherein the characteristics of a particular host device comprise one or more of: a location of the particular host device, an application executed by the particular host device, or a device configuration of the particular host device.

* * * * *

UNITED STATES PATENT AND TRADEMARK OFFICE
CERTIFICATE OF CORRECTION

| | | |
|---|---|---|
| PATENT NO. | : 10,404,727 B2 | Page 1 of 1 |
| APPLICATION NO. | : 15/176678 | |
| DATED | : September 3, 2019 | |
| INVENTOR(S) | : Jean-Philippe Vasseur et al. | |

It is certified that error appears in the above-identified patent and that said Letters Patent is hereby corrected as shown below:

In the Specification

Column 15, Line 24, should read:
may form a first cluster 502a that includes host devices/

Column 17, Line 23, should read:
custom message called CLUSTER-POLICY( ), to upload/

Signed and Sealed this
Third Day of March, 2020

Andrei Iancu
*Director of the United States Patent and Trademark Office*